United States Patent
Balaskovic

(10) Patent No.: US 8,297,550 B2
(45) Date of Patent: Oct. 30, 2012

(54) LENTICULAR AIRSHIP AND ASSOCIATED CONTROLS

(75) Inventor: Pierre Balaskovic, Verrières les Buisson (FR)

(73) Assignee: LTA Corporation, Dover, DE (US)

( * ) Notice: Subject to any disclaimer, the term of this patent is extended or adjusted under 35 U.S.C. 154(b) by 739 days.

(21) Appl. No.: 12/222,355

(22) Filed: Aug. 7, 2008

(65) Prior Publication Data

US 2010/0320314 A1    Dec. 23, 2010

Related U.S. Application Data

(60) Provisional application No. 60/935,383, filed on Aug. 9, 2007.

(51) Int. Cl.
*G01C 21/00* (2006.01)

(52) U.S. Cl. ............... 244/96; 340/974; 701/3; 701/14; 362/471

(58) Field of Classification Search ............... 244/1 R, 244/30, 75.1, 96; 701/4, 14; 340/970, 973, 340/977, 967; 362/470, 471; *G01C 21/00*
See application file for complete search history.

(56) References Cited

U.S. PATENT DOCUMENTS

| | | | |
|---|---|---|---|
| 1,027,590 A | 5/1912 | Bucher | |
| 1,944,467 A | 1/1934 | Sabin | |
| 2,286,014 A * | 6/1942 | Rowe | 33/348 |
| 2,935,275 A | 5/1960 | Grayson | |
| 3,337,845 A * | 8/1967 | Hart | 340/975 |
| 3,432,120 A | 3/1969 | Guerrero | |
| D213,731 S | 4/1969 | Hsi | |
| 3,477,168 A | 11/1969 | Trodglen | |
| 3,529,283 A * | 9/1970 | Emerson et al. | 340/947 |
| 3,580,636 A | 5/1971 | Setto | |

(Continued)

FOREIGN PATENT DOCUMENTS

CA    1054124 A    5/1979

(Continued)

OTHER PUBLICATIONS

Luffman, "Aeroraft The Alternative Aircraft for Heavy Lift Transport or Crane Use," American Institute of Aeronautics and Astronautics, AIAA's 3$^{rd}$ Annual Aviation Technology, Integration, and Operations (ATIO) Tech, Nov. 17-19, 2003, Denver, Colorado, AIAA 2003-6754, pp. 1-13.

(Continued)

*Primary Examiner* — Rob Swiatek
*Assistant Examiner* — Marisa Conlon
(74) *Attorney, Agent, or Firm* — Finnegan, Henderson, Farabow, Garrett & Dunner, L.L.P.

(57) ABSTRACT

A system for controlling yaw associated with an airship may include one or more vertical control surfaces associated with the airship, a first power source and a second power source, each configured to provide a thrust associated with the airship, and a yaw control configured to receive an input indicative of a desired yaw angle. The system may further include a controller communicatively connected to the yaw control, the one or more vertical control surfaces, and the first and second power sources. The controller may be configured to receive an output signal from the yaw control corresponding to the desired yaw angle and to generate a control signal configured to modify a state associated with at least one of the one or more vertical control surfaces, the first power source, and the second power source, such that the airship substantially attains the desired yaw angle.

23 Claims, 15 Drawing Sheets

U.S. PATENT DOCUMENTS

| | | | |
|---|---|---|---|
| RE28,454 E | 6/1975 | Fitzpatrick et al. | |
| 3,946,364 A * | 3/1976 | Codomo et al. | 701/3 |
| 3,970,270 A | 7/1976 | Pittet, Jr. | |
| 3,971,533 A | 7/1976 | Slater | |
| 3,976,265 A | 8/1976 | Doolittle | |
| 4,085,912 A | 4/1978 | Slater | |
| 4,326,681 A | 4/1982 | Eshoo | |
| 4,461,436 A | 7/1984 | Messina | |
| D274,999 S | 8/1984 | Reeves | |
| D280,194 S | 8/1985 | Bothe | |
| 4,583,094 A * | 4/1986 | Mosier | 340/975 |
| 4,685,640 A | 8/1987 | Warrington et al. | |
| D305,418 S | 1/1990 | Blake | |
| 4,901,948 A | 2/1990 | Panos | |
| D307,131 S | 4/1990 | Kramer | |
| 4,914,976 A | 4/1990 | Wyllie | |
| D307,884 S | 5/1990 | Ninkovich | |
| D309,887 S | 8/1990 | Ninkovich | |
| 5,096,141 A | 3/1992 | Schley | |
| 5,170,963 A | 12/1992 | Beck, Jr. | |
| 5,240,206 A | 8/1993 | Omiya | |
| 5,281,960 A * | 1/1994 | Dwyer, III | 345/31 |
| 5,348,251 A | 9/1994 | Ferguson | |
| 5,351,911 A | 10/1994 | Neumayr | |
| 5,368,256 A | 11/1994 | Kalisz et al. | |
| 5,516,060 A | 5/1996 | McDonnell | |
| 5,614,897 A * | 3/1997 | Durnford | 340/973 |
| 5,675,327 A * | 10/1997 | Coirier et al. | 340/973 |
| 5,755,402 A | 5/1998 | Henry | |
| 5,823,468 A | 10/1998 | Bothe | |
| 5,906,335 A | 5/1999 | Thompson | |
| D418,804 S | 1/2000 | Glasgow et al. | |
| 6,010,093 A | 1/2000 | Paulson | |
| 6,019,312 A | 2/2000 | Blenn | |
| D424,508 S | 5/2000 | Hankinson et al. | |
| 6,164,589 A | 12/2000 | Kalisz | |
| 6,196,498 B1 | 3/2001 | Eichstedt et al. | |
| 6,231,007 B1 | 5/2001 | Schäfer | |
| 6,286,783 B1 | 9/2001 | Kuenkler | |
| 6,293,493 B1 | 9/2001 | Eichstedt et al. | |
| 6,302,357 B1 | 10/2001 | Kalisz | |
| 6,311,925 B1 | 11/2001 | Rist | |
| 6,315,242 B1 | 11/2001 | Eichstedt et al. | |
| 6,328,257 B1 | 12/2001 | Schäfer | |
| 6,549,179 B2 * | 4/2003 | Youngquist et al. | 345/39 |
| 6,565,037 B1 | 5/2003 | Tonkovich | |
| 6,577,929 B2 * | 6/2003 | Johnson et al. | 701/4 |
| 6,648,272 B1 | 11/2003 | Kothmann | |
| 6,659,838 B1 | 12/2003 | Anderson | |
| 6,702,229 B2 * | 3/2004 | Anderson et al. | 244/1 R |
| 6,880,783 B2 | 4/2005 | Munk | |
| 6,885,313 B2 * | 4/2005 | Selk et al. | 340/945 |
| 6,892,118 B1 * | 5/2005 | Feyereisen | 701/14 |
| 6,966,523 B2 | 11/2005 | Colting | |
| 7,040,572 B2 | 5/2006 | Munk | |
| 7,055,777 B2 | 6/2006 | Colting | |
| 7,108,228 B1 | 9/2006 | Marshall | |
| 7,137,592 B2 | 11/2006 | Barocela et al. | |
| 7,156,342 B2 | 1/2007 | Heaven, Jr. et al. | |
| 7,159,817 B2 | 1/2007 | VanderMey et al. | |
| 7,216,069 B2 * | 5/2007 | Hett | 703/6 |
| D583,294 S | 12/2008 | Balaskovic | |
| 7,825,830 B2 * | 11/2010 | Joyner | 340/967 |
| 2002/0003189 A1 | 1/2002 | Kuenkler | |
| 2002/0109045 A1 | 8/2002 | Beach et al. | |
| 2003/0001044 A1 | 1/2003 | Munk | |
| 2003/0023355 A1 * | 1/2003 | Johnson et al. | 701/4 |
| 2003/0127557 A1 | 7/2003 | Anderson et al. | |
| 2003/0234320 A1 | 12/2003 | Colting | |
| 2004/0162000 A1 | 8/2004 | Anderson | |
| 2005/0277359 A1 | 12/2005 | Anderson | |
| 2006/0016930 A1 | 1/2006 | Pak | |
| 2006/0060695 A1 | 3/2006 | Walden et al. | |
| 2006/0065777 A1 | 3/2006 | Walden et al. | |
| 2006/0151666 A1 | 7/2006 | VanderMey et al. | |
| 2006/0227013 A1 | 10/2006 | Harvison et al. | |
| 2006/0261213 A1 | 11/2006 | Lavan | |
| 2006/0284002 A1 | 12/2006 | Stephens et al. | |
| 2007/0295859 A1 | 12/2007 | Colvin | |
| 2008/0179454 A1 | 7/2008 | Balaskovic | |
| 2009/0109064 A1 * | 4/2009 | Joyner | 340/970 |
| 2010/0067118 A1 * | 3/2010 | Takahashi et al. | 359/633 |
| 2010/0076628 A1 * | 3/2010 | Boorman et al. | 701/11 |
| 2011/0051041 A1 * | 3/2011 | Yashiro | 349/62 |

FOREIGN PATENT DOCUMENTS

| | | |
|---|---|---|
| DE | 210003 | 5/1909 |
| DE | 26 40 433 A1 | 4/1977 |
| DE | 3508101 A1 | 9/1986 |
| DE | 10011319 A1 | 9/2001 |
| DE | 20116152 U1 | 2/2002 |
| DE | 10058072 A1 | 6/2002 |
| DE | 20204023 U1 | 7/2002 |
| DE | 10120232 A1 | 10/2002 |
| DE | 10121854 C1 | 11/2002 |
| DE | 10139877 A1 | 2/2003 |
| DE | 10148589 A1 | 4/2003 |
| DE | 10148590 A1 | 4/2003 |
| DE | 10201133 A1 | 7/2003 |
| DE | 10210541 A1 | 9/2003 |
| DE | 10210542 A1 | 9/2003 |
| DE | 10216480 A1 | 10/2003 |
| DE | 10226868 A1 | 12/2003 |
| DE | 10228048 A1 | 1/2004 |
| DE | 10252895 A1 | 5/2004 |
| DE | 10252896 A1 | 5/2004 |
| DE | 10252908 A1 | 5/2004 |
| DE | 10252909 A1 | 5/2004 |
| DE | 10252910 A1 | 5/2004 |
| DE | 10252911 A1 | 5/2004 |
| DE | 10 2005 013529 A1 | 6/2007 |
| EP | 0 095 763 A2 | 12/1983 |
| EP | 0 282 425 A1 | 9/1988 |
| EP | 0 291 355 A2 | 11/1988 |
| EP | 0 503 801 A2 | 9/1992 |
| EP | 0 619 792 B1 | 10/1994 |
| EP | 0 714 362 B1 | 6/1996 |
| EP | 0 729 423 B1 | 9/1996 |
| EP | 0 745 045 B1 | 12/1996 |
| EP | 1 070 008 B1 | 1/2001 |
| EP | 1 160 156 A2 | 12/2001 |
| EP | 1 292 474 B1 | 3/2003 |
| EP | 1 294 608 B1 | 3/2003 |
| EP | 1 451 063 B1 | 9/2004 |
| EP | 1 529 726 A2 | 5/2005 |
| EP | 1 770 009 A2 | 4/2007 |
| FR | 2 630 397 A1 | 10/1989 |
| FR | 2830838 B1 | 4/2003 |
| GB | 2 197 276 A | 5/1988 |
| GB | 2 250 007 A | 5/1992 |
| GB | 2 275 036 A | 8/1994 |
| GB | 2 278 815 A | 12/1994 |
| GB | 2 300 010 A | 10/1996 |
| GB | 2 359 534 A | 8/2001 |
| GB | 2359534 A | 8/2001 |
| GB | 2 366 274 A | 3/2002 |
| JP | 52 145999 | 12/1977 |
| RU | 1799335 A3 | 2/1993 |
| RU | 37568 | 10/1993 |
| RU | 2009073 C1 | 3/1994 |
| RU | 40822 S | 1/1995 |
| RU | 2028249 C1 | 2/1995 |
| RU | 2070136 C1 | 12/1996 |
| RU | 2092381 C1 | 10/1997 |
| RU | 2098318 C1 | 12/1997 |
| RU | 2111146 C1 | 5/1998 |
| RU | 2111147 C1 | 5/1998 |
| RU | 2114027 C1 | 6/1998 |
| RU | 2141911 C1 | 11/1999 |
| RU | 2196703 C2 | 1/2003 |
| RU | 2249536 C1 | 4/2005 |
| RU | 2250122 C1 | 4/2005 |
| UA | 10870 A | 12/1996 |
| UA | 32397 A | 12/2000 |
| UA | 55928 A | 4/2003 |
| WO | WO 92/06002 A1 | 4/1992 |
| WO | WO 93/13979 A1 | 7/1993 |

| | | |
|---|---|---|
| WO | WO 93/24364 A2 | 12/1993 |
| WO | WO 95/05307 A1 | 2/1995 |
| WO | WO 95/14607 A1 | 6/1995 |
| WO | WO 95/22486 A1 | 8/1995 |
| WO | WO 95/27652 A1 | 10/1995 |
| WO | WO 95/32893 A1 | 12/1995 |
| WO | WO 95/32894 A1 | 12/1995 |
| WO | WO 96/38340 A1 | 12/1996 |
| WO | WO 97/15492 | 5/1997 |
| WO | WO-97/49606 A1 | 12/1997 |
| WO | WO 98/28188 A1 | 7/1998 |
| WO | WO 98/29303 A2 | 7/1998 |
| WO | WO 98/31589 A1 | 7/1998 |
| WO | WO 99/67131 A1 | 12/1999 |
| WO | WO 00/48902 A1 | 8/2000 |
| WO | WO 00/73142 A2 | 12/2000 |
| WO | WO 01/42082 A1 | 6/2001 |
| WO | WO 01/68447 A2 | 9/2001 |
| WO | WO 01/94172 A1 | 12/2001 |
| WO | WO 03/021291 A1 | 3/2003 |
| WO | WO 03/047967 A1 | 6/2003 |
| WO | WO 03/055745 A1 | 7/2003 |
| WO | WO 03/055746 A1 | 7/2003 |
| WO | WO 03/074356 A3 | 9/2003 |
| WO | WO 03/097450 A1 | 11/2003 |
| WO | WO 03/097451 A1 | 11/2003 |
| WO | WO 2004/000642 A1 | 12/2003 |
| WO | WO 2004/074091 A2 | 9/2004 |
| WO | WO 2004/087499 A2 | 10/2004 |
| WO | WO 2005/002960 A1 | 1/2005 |
| WO | WO 2005/007508 A1 | 1/2005 |
| WO | WO 2006/061617 A1 | 6/2006 |
| WO | WO 2006/085919 A2 | 8/2006 |
| WO | WO 2006/137880 A2 | 12/2006 |
| WO | WO 2007/036038 A1 | 4/2007 |
| WO | WO 2007/037932 A2 | 4/2007 |
| WO | WO 2007/045091 A1 | 4/2007 |
| WO | WO 2007/065649 A2 | 6/2007 |

OTHER PUBLICATIONS

PCT report of partial international search regarding PCT/US2007/021962, Dec. 2, 2008.
*Future Flight?*, Leslie Deane, Ballooning, The Journal of the Balloon Federation of America, Jul./Aug. 2008, pp. 26-32.
PCT Communication Relating to the Results of the Partial International Search re PCT/US2008/009453, mailed Feb. 4, 2009.
Repoulias et al., "Dynamically Feasible Trajectory and Open-Loop Control Design for Unmanned Airships," 2007 Mediterranean Conference on Control and Automation, Jul. 27, 2007, XP002511581, Athens, Greece.
Nagabhushan et al., "Directional control of an advanced airship," AIAA Lighter-Than-Air Systems Technology Conference, 11th, Clearwater Beach, FL, May 15-18, 1995, Technical Papers (A95-30317 07-01), Washington, DC, American Institute of Aeronautics and Astronautics, May 15, 1995, pp. 107-116.
PCT International Search Report re PCT/US2008/009453, mailed Apr. 3, 2009.
PCT International Search Report re PCT/US2007/021962, mailed Apr. 3, 2009.
European Examination Report from EP Application No. 08 827 387.5-1254, Jun. 6, 2010. (4 pages.).
European Examination Report from EP Application No. 07 873 810.1-2422, dated Aug. 16, 2010. (4 pages.).
Office Action dated Sep. 3, 2009, from U.S. Appl. No. 11/907,883. (16 pages).
Final Office Action dated Apr. 1, 2010, from U.S. Appl. No. 11/907,883. (13 pages).
Advisory Action dated Aug. 3, 2010, from U.S. Appl. No. 11/907,883. (3 pages).
Amendment After Final dated Aug. 17, 2010, from U.S. Appl. No. 11/907,883. (28 pages).
Notice of Allowance dated Sep. 1, 2010, from U.S. Appl. No. 11/907,883. (4 pages).
L. Balis Crema et al., "Some Trends in Airship Technology Developments," NATO, Apr. 10-15, 1983 (14 pages).
Construction cost Management Co., "With Us, Future Comes Faster," available at http://www.buildcostcontrol.com/Airship/tabid/640/Default.aspx, 2008. (1 page.).
Edwin Mowforth, 'Lenticular History,' an excerpt from 'An Introduction to the Airship,' Second Edition, 2001, and information sheet. (7 pages.).
E. Udartsev and E. Tyan, 'Dirigible of a New Generation in Kiev,' available at http://www.aviajournal.com/sections/journal/arh/magazine/200112/index.html, 2001. (9 pages.).
http://dynalifter.com/, accessed Dec. 1, 2009 (16 pages).
http://www.hybridairvehicles.net/index.html, accessed Dec. 1, 2009 (23 pages).
http://www.skylifter.com.au/, accessed Dec. 1, 2009 (17 pages).
Ahmed Ghanmi and Abderrahmane Sokri, "Airships for military logistics heavy lift: A performance assessment for Northern operation applications," Defence R&D Canada—CORA, Technical Memorandum, Jan. 2010 (63 pages).
21$^{st}$ Century Airships Web Site, accessed Jun. 22, 2007, http://www.21stcenturyairships.com (1 page).
ALA-40 proof-of-concept—Thermoplane, Photos from "Janes—All the World's Aircraft," 1997 (2 pages).
Ben Ionnatta, "Spy Blimps and Heavy Lifters: The Latest Thing in Airships," Air & Space Smithsonian, Sep. 2007 (2 pages).
Blimp Europa N2A Web Site, accessed Oct. 11, 2006, machine translated Jun. 25, 2007, http://www.blimp-n2a.com/cl5alpha.htm (3 pages).
CargoLifter Web Site, accessed Jun. 19, 2007, http://cargolifter.info (2 pages).
Daniel P. Raymer, "Aircraft Design: A Conceptual Approach," 4$^{th}$ Ed., 2006, pp. 652-659, American Institute of Aeronautics and Astronautics, Inc., Reston, Virginia (11 pages).
Demonstrator Alpha, Lenticular Aircraft of Air Photography, accessed Oct. 11, 2006, machine translated Jun. 25, 2007, http://perso.orange.fr/balaskovic/actu-texte.html (2 pages).
Dynalifter Web Site, accessed Jun. 22, 2007, http://www.dynalifter.com (7 pages).
"Lift Equations," derived from "The Non-Rigid Airship Test and Evaluation Manual," U.S. Navy, 1940 (2 pages).
Michael A. Dornheim, "Skunks Working," Aviation Week, Feb. 6, 2006, accessed Jun. 22, 2007, http://www.aviationweek.com/aw/generic/story_generic.jsp?channel=awst&id=news/020606p2.xml (2 pages).
Gabriel A. Khoury and J. David Gillett, "Lenticular Mathematics," an excerpt from "Airship Technology," Cambridge University Press, 1999 (6 pages).
Lord Ventry and Eugene Kolesnik, Excerpt from "Jane's Pocket Book of Airships," Collier Books, 1977, pp. 94-96 (6 pages).
Edwin Mowforth, "Lenticular History," an excerpt from "An Introduction to the Airship," Second Edition (6 pages), Sep. 2007.
Operation-LTA Web Site, accessed Oct. 11, 2006, http://web.archive.org/web/20040405173243/www.operation-lta.com (5 pages).
Stephane Doncieux and Jean-Arcady Meyer, "Evolving Neural Networks for the Control of a Lenticular Blimp," AnimatLab—LIP6, 2003, France, http://animatlab.lip6.fr (12 pages).
Thomas F. Norton, "Now There's a 'Personal Blimp:' Unique Foldable Frame Makes it Practical as a Second Century Aircraft," General Aviation News, Jan. 19, 2007, p. 18-19, 59$^{th}$ year, No. 2, Flyer Media, Inc., Lakewood, WA (2 pages).
Worldwide Aeros Corporation Web Site, accessed Jun. 22, 2007, http://www.aerosml.com (4 pages).
Yu. Boiko and V.A. Turian, "Dreamboat of Centuries," Moscow, Machine Building, p. 52, Jun. 13, 1991 (2 pages).
U.S. Army Advanced Materiel Concepts Agency, "Aerial Very Heavy Lift Concepts for the 1990 Army vol. I," Basic Report, Nov. 1969 (41 pages).
U.S. Army Advanced Materiel Concepts Agency, "Aerial Very Heavy Lift Concepts for the 1990 Army vol. III," Academic and Industrial Presentations, Nov. 1, 1969 (200 pages).
Boeing Vertol Company for NASA Ames, "Feasibility Study of Modern Airships," Final Report, vol. 1, May 1975 (478 pages).
P.A. Mackrodt, "Further Studies in the Concept of Delta-Winged Hybrid Airships," J. Aircraft, Oct. 1, 1980, pp. 734-740.

Mark D. Ardema, "Missions and Vehicle Concepts for Modern, Propelled, Lighter-Than-Air Vehicles," AGARD, NATO, Feb. 1985 (50 pages).

Dr. R.S. Ross et al., "New Air Transport for Heavy Bulky Cargo" (Advanced Copy), Apr. 20, 1962 (35 pages).

W.L. Marcy, "Parametric Design Study of Fully-Buoyant Naval Air Vehicles," NADC, Nov. 30, 1976 (85 pages).

Stepler, Richard M., "Return to Lighter Than Air Transportation for Military and Civilian Application," Defense Systems Management School, Fort Belvoir, VA, Nov. 1973 (56 pages).

L.Crema et al., "Some Trends in Airship Technology Developments," NATO, Aug. 25, 1983 (14 pages).

"Types of Lighter-Than-Air Aircraft," Author unknown, Publication date unknown (34 pages).

Mark D. Ardema, "Vehicle Concepts and Technology Requirements for Buoyant Heavy-Lift Systems," NASA, 1979 (36 pages).

Mark D. Ardema, "Vehicle Concepts and Technology Requirements for Buoyant Heavy-Lift Systems," NASA Technical Paper, 1981 (18 pages).

David Bailey and William Mueller, "North Warning Airship Program, Final Overview," Naval Air Development Center, Apr. 6, 1987 (211 pages).

"Preliminary Design Investigation for New Payload and Ground Handling Concepts for Airships Operating in Remote Arctic Regions, Final Report," Naval Air Development Center, Mar. 31, 1986 (226 pages).

Capt. J. Arvai et al., "North Warning Program Airship Feasibility Tests, Final Report," Naval Air Development Center, Feb. 20, 1987 (43 pages).

Capt. J. Arvai et al., "North Warning System Familiarisation, Feasibility and Operational Demonstration, Final Report," Naval Air Development Center, Apr. 19, 1986 (134 pages).

Douglas Botting, "The Giant Airships," Time-Life Books, Alexandria, VA 1980 (186 pages).

E. Udartsev and E. Tyan, "Dirigible of a New Generation in Kiev," available at http://www.aviajournal.com/sections/journal/arh/magazine/200112/index.html, (9 pages).

Edwin Mowforth, "An Introduction to the Airship," Third Edition, The Airship Association, Sep. 2007 (157 pages).

Construction Cost Management Co., "With Us, Future Comes Faster," available at http://www.buildcostcontrol.com/Airship/tabid/640/Default.aspx, 2008 (1 page).

* cited by examiner

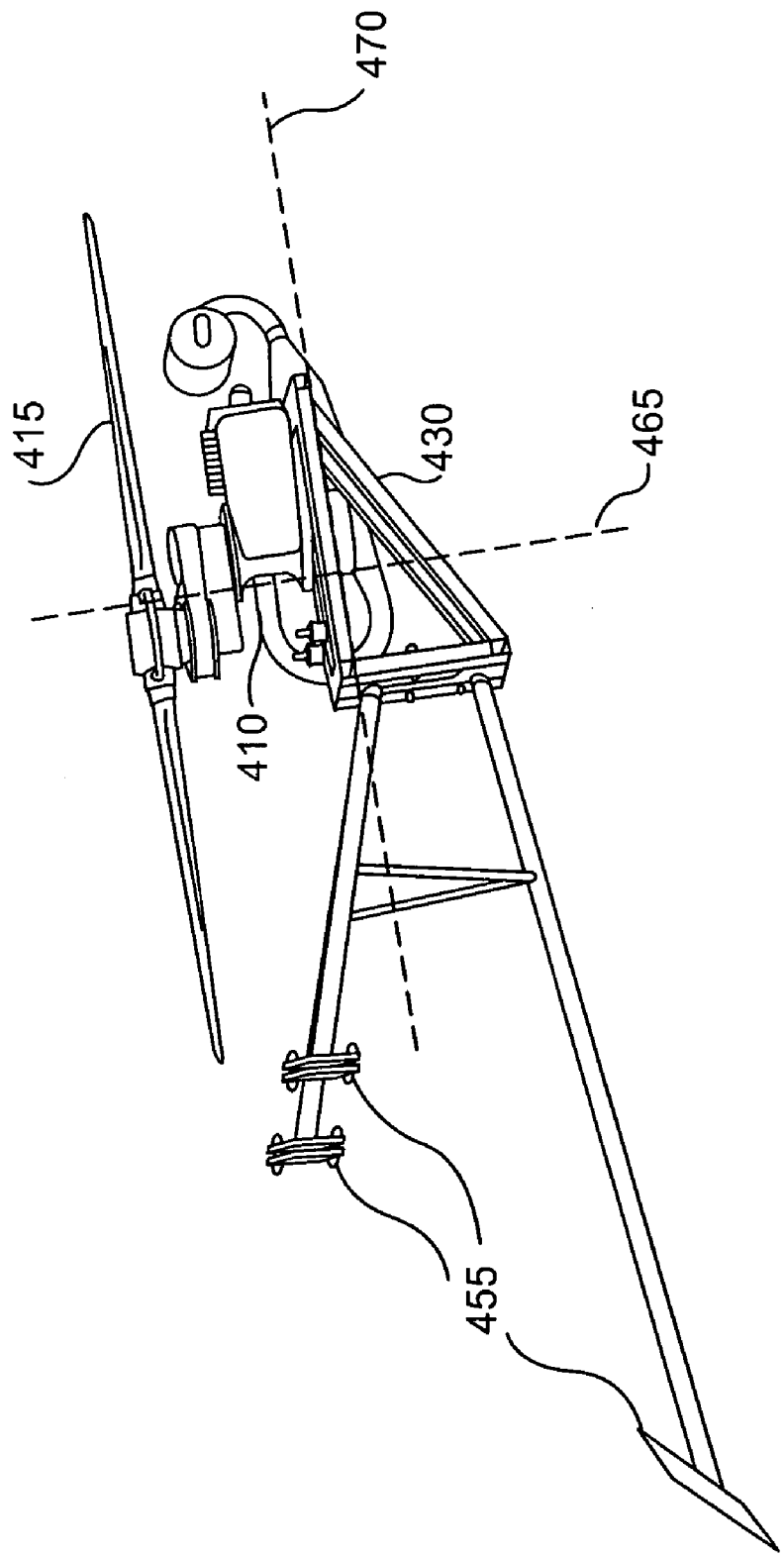

LENTICULAR AIRSHIP AND ASSOCIATED CONTROLS

RELATED APPLICATIONS

This application claims priority under 35 U.S.C. §119 to U.S. Provisional Application No. 60/935,383, filed Aug. 9, 2007, the subject matter of which is hereby incorporated by reference.

In addition, this application is related to U.S. patent application Ser. No. 11/907,883, entitled "Lenticular Airship," filed Oct. 18, 2007, and published as U.S. Patent Pub. No. 2008/0179454, the subject matter of which is hereby incorporated by reference.

TECHNICAL FIELD

The disclosure is related to lenticular airships. In particular, the disclosure relates to an airship and associated controls for providing enhanced maneuverability and operability.

BACKGROUND INFORMATION

Aerostatic lighter-than-air airships have seen substantial use since 1783 following the first successful manned flight of the Montgolfier brothers' hot air balloon. Numerous improvements have been made since that time, but the design and concept of manned hot air balloons remains substantially similar. Such designs may include a gondola for carrying an operator and passengers, a heating device (e.g., a propane torch), and a large envelope or bag affixed to the gondola and configured to be filled with air. The operator may then utilize the heating device to heat the air until the buoyant forces of the heated air exert sufficient force on the envelope to lift the balloon and an attached gondola. Navigation of such an airship has proven to be difficult, mainly due to wind currents and lack of propulsion units for directing the balloon.

To improve on the concept of lighter-than-air flight, some lighter-than-air airships have evolved to include propulsion units, navigational instruments, and flight controls. Such additions may enable an operator of such an airship to direct the thrust of the propulsion units in such a direction as to cause the airship to proceed as desired. Airships utilizing propulsion units and navigational instruments typically do not use hot air as a lifting gas (although hot air may be used), with many operators instead preferring lighter-than-air lifting gases such as hydrogen and helium. These airships may also include an envelope for retaining the lighter-than-air gas, a crew area, and a cargo area, among other things. The airships are typically streamlined in a blimp- or zeppelin-like shape (also known as "cigar" shaped), which, while providing reduced drag, may subject the airship to adverse aeronautic effects (e.g., weather cocking and reduced maneuverability).

Airships other than traditional hot air balloons may be divided into several classes of construction: rigid, semi-rigid, non-rigid, and hybrid type. Rigid airships typically possess rigid frames containing multiple, non-pressurized gas cells or balloons to provide lift. Such airships generally do not depend on internal pressure of the gas cells to maintain their shape. Semi-rigid airships generally utilize some pressure within a gas envelope to maintain their shape, but may also have frames along a lower portion of the envelope for purposes of distributing suspension loads into the envelope and for allowing lower envelope pressures, among other things. Non-rigid airships typically utilize a pressure level in excess of the surrounding air pressure in order to retain their shape, and any load associated with cargo carrying devices is supported by the gas envelope and associated fabric. The commonly used blimp is an example of a non-rigid airship.

Hybrid airships may incorporate elements from other airship types, such as a frame for supporting loads and an envelope utilizing pressure associated with a lifting gas to maintain its shape. Hybrid airships also may combine characteristics of heavier-than-air airship (e.g., airplanes and helicopters) and lighter-than-air technology to generate additional lift and stability. It should be noted that many airships, when fully loaded with cargo and fuel, may be heavier than air and thus may use their propulsion system and shape to generate aerodynamic lift necessary to stay aloft. However, in the case of a hybrid airship, the weight of the airship and cargo may be substantially compensated for by lift generated by forces associated with a lifting gas such as, for example, helium. These forces may be exerted on the envelope, while supplementary lift may result from aerodynamic lift forces associated with the hull.

A lift force (i.e., buoyancy) associated with a lighter-than-air gas may depend on numerous factors, including ambient pressure and temperature, among other things. For example, at sea level, approximately one cubic meter of helium may balance approximately a mass of one kilogram. Therefore, an airship may include a correspondingly large envelope with which to maintain sufficient lifting gas to lift the mass of the airship. Airships configured for lifting heavy cargo may utilize an envelope sized as desired for the load to be lifted.

Hull design and streamlining of airships may provide additional lift once the airship is underway. For example, a lenticular airship may have a discus-like shape in circular planform where the diameter may be greater than an associated height. Therefore, the weight of an airship may be compensated by the aerodynamic lift of the hull and the forces associated with the lifting gas including, for example, helium.

However, a lighter-than-air airship may present unique problems associated with aerodynamic stability, based on susceptibility to adverse aerodynamic forces. For example, traditional airships may typically exhibit low aerodynamic stability in the pitch axis. Lenticular shaped bodies may be aerodynamically less stable than either spherical or ellipsoidal shaped bodies. For example, the boundary layer airflow around the body may separate and create significant turbulence at locations well forward of the trailing edge. Therefore, systems and methods enhancing aerodynamic stability may be desirable.

Further, increasing flight controllability may be another challenging but important aspect for lighter-than-air airship design. For example, the airship may be lifted by thrust forces generated by vertically-directed propulsion engines, and may move forward or backwards powered by thrust forces generated by horizontally-directed propulsion engines. In traditional airship flight control systems, however, propeller pitch has not been variably adjustable. Therefore, the operator of such airships could not control a pitch angle and/or a lift force, among other things, associated with the airship through adjustment of propeller pitch. Further, vertically- and horizontally-directed propulsion engines have been separately controlled, without provision for coordination of these engines with horizontal and vertical stabilizer systems. Therefore, traditional airship controls have not provided maneuverability and response desired by operators. In addition, the operator may wish to know certain flight-related parameters during the flight without having to look away from the view ahead of the airship, to provide more effective control input. For example, the operator may desire an indication of the attitude of the airship to be viewable directly in line of sight (LoS) through a gondola canopy before providing pitch/roll control inputs to the airship. Accordingly, systems and methods for enhancing flight controllability including but not limited to, airship pitch and yaw control, coordination of one or more control systems, and/or indication of certain airship status parameters, may be desirable.

The present disclosure may be directed to addressing one or more of the desires discussed above utilizing various exemplary embodiments of an airship.

SUMMARY OF THE DISCLOSURE

In one aspect, the present disclosure is directed to a system for controlling yaw associated with an airship. The system may include one or more vertical control surfaces associated with an airship, a first power source and a second power source, each configured to provide a thrust associated with an airship, and a yaw control configured to receive an input indicative of a desired yaw angle. The system may further include a controller communicatively connected to the yaw control, the one or more vertical control surfaces, and the first and second power sources. The controller may be configured to receive an output signal from the yaw control corresponding to the desired yaw angle. The controller may be further configured to generate a control signal configured to modify a state associated with at least one of the one or more vertical control surfaces, the first power source, and the second power source, such that the airship substantially attains the desired yaw angle.

In another aspect, the present disclosure is directed to a method for controlling yaw associated with an airship including a first power source, a second power source, and a vertical control surface. The method may include receiving a signal indicative of a desired yaw angle for the airship and determining an operational state associated with the first power source, the second power source, and the vertical control surface. The method may further include modifying the operational state associated with the first power source, the second power source, and the vertical control surface to cause airship to attain the desired yaw angle.

In yet another aspect, the present disclosure is directed to a system for controlling yaw associated with a lenticular airship defining a periphery and a nose. The system may include a vertical control surface associated with an empennage of the lenticular airship, a first power source located on the periphery of the lenticular airship at a position 120 degrees from the nose and configured to provide a thrust associated with the lenticular airship, and a second power source located on the periphery of the lenticular airship at a position negative 120 degrees from the nose and configured to provide a thrust associated with the lenticular airship. The system may further include a pedal actuated yaw control configured to receive an input indicative of a desired yaw angle. The system may also include a controller communicatively connected to the yaw control, the vertical control surface, and the first and second power sources. The controller may be configured to receive an output signal from the yaw control corresponding to the desired yaw angle. The controller may be further configured to generate a control signal configured to modify a state associated with at least one of the one or more vertical control surfaces, the first power source, and the second power source, such that the lenticular airship substantially attains the desired yaw angle.

According to a further aspect, the present disclosure is directed to a system for controlling a flight parameter associated with an airship. The system may include a frame, and a support structure slidably mounted to the frame and configured to provide support to an airship control and a slider output signal indicative of an offset of the support structure from a predetermined neutral position of the frame. The system may further include a processor communicatively connected to the frame, the support structure, and airship control. The processor may be configured to receive the slider output signal, wherein the processor is configured to generate a control signal for modifying the flight parameter based on the slider output signal.

According to a further aspect, the present disclosure is directed to a method for controlling at least one parameter associated with an airship. The method may include sliding a support structure upon a frame, the support structure being configured to provide a slider output signal indicative of an offset of the support structure from a predetermined neutral position and including a control. The method may further include receiving the slider output signal at a controller, and generating a control signal based on the slider output signal; and modifying a flight parameter associated with the airship via the control signal.

In yet another aspect, the present disclosure is directed to a system for controlling a propeller pitch associated with each of three or more propulsion assemblies associated with an airship. The system may include a control configured to receive an input from an operator indicative of a desired lift force. The system may further include a processor configured to receive a signal indicative of the desired lift force from the control and generate an output signal for causing a substantially similar modification to operation of each of the three or more propulsion assemblies, such that the desired lift force is substantially applied to the airship.

In yet another aspect, the present disclosure is directed to a method for controlling propeller pitch related to three or more propulsion assemblies associated with an airship. The method may include receiving an input from an operator indicative of a desired lift force, and modifying operation of the three or more propulsion assemblies, such that the desired lift force is substantially applied to the airship.

In yet another aspect, the present disclosure is directed to a system for controlling a lift force associated with an airship. The system may include three propulsion assemblies, each propulsion assembly including a variable pitch propeller, and a control configured to receive an input from an operator indicative of a desired lift force. The system may further include a processor communicatively connected to the three propulsion assemblies and the control. The processor may be configured to receive a signal indicative of the desired lift force from the control, and transmit a control signal to the three propulsion assemblies configured to cause each of the three propulsion assemblies to produce a substantially similar thrust vector.

In yet another aspect, the present disclosure is directed to a system for displaying attitude information associated with an airship. The system may include a first plurality of indicators arranged along a horizontal axis, and a second plurality of indicators arranged along a vertical axis. The system may include a processor configured to determine an attitude associated with the airship; and cause at least one indicator of the first plurality of indicators or the second plurality of indicators to respond based on the attitude.

In yet another aspect, the present disclosure is directed to a method for displaying attitude information associated with an airship. The method may include receiving a signal indicative of an attitude associated with the airship, and determining an attitude associated with the airship based on the signal. The method may further include causing at least one indicator of a first plurality of indicators and a second plurality of indicators to respond according to the attitude.

In yet another aspect, the present disclosure is directed to a system for displaying attitude information associated with an airship. The system may include a sensor configured to sense an attitude associated with the airship and generate a corresponding sensor output, and a substantially transparent display. The system may further include a first plurality of indicators arranged along a horizontal axis of the display, and a second plurality of indicators arranged along a vertical axis of the display. The system may also include a processor configured to determine an attitude associated with the airship based on the sensor output, and cause at least one indicator of the first plurality of indicators or the second plurality of indicators to light according to the attitude.

BRIEF DESCRIPTION OF THE FIGURES

FIG. 3A is a schematic, partial perspective view of an exemplary embodiment of a vertical propulsion assembly;

DETAILED DESCRIPTION

Figure 1:
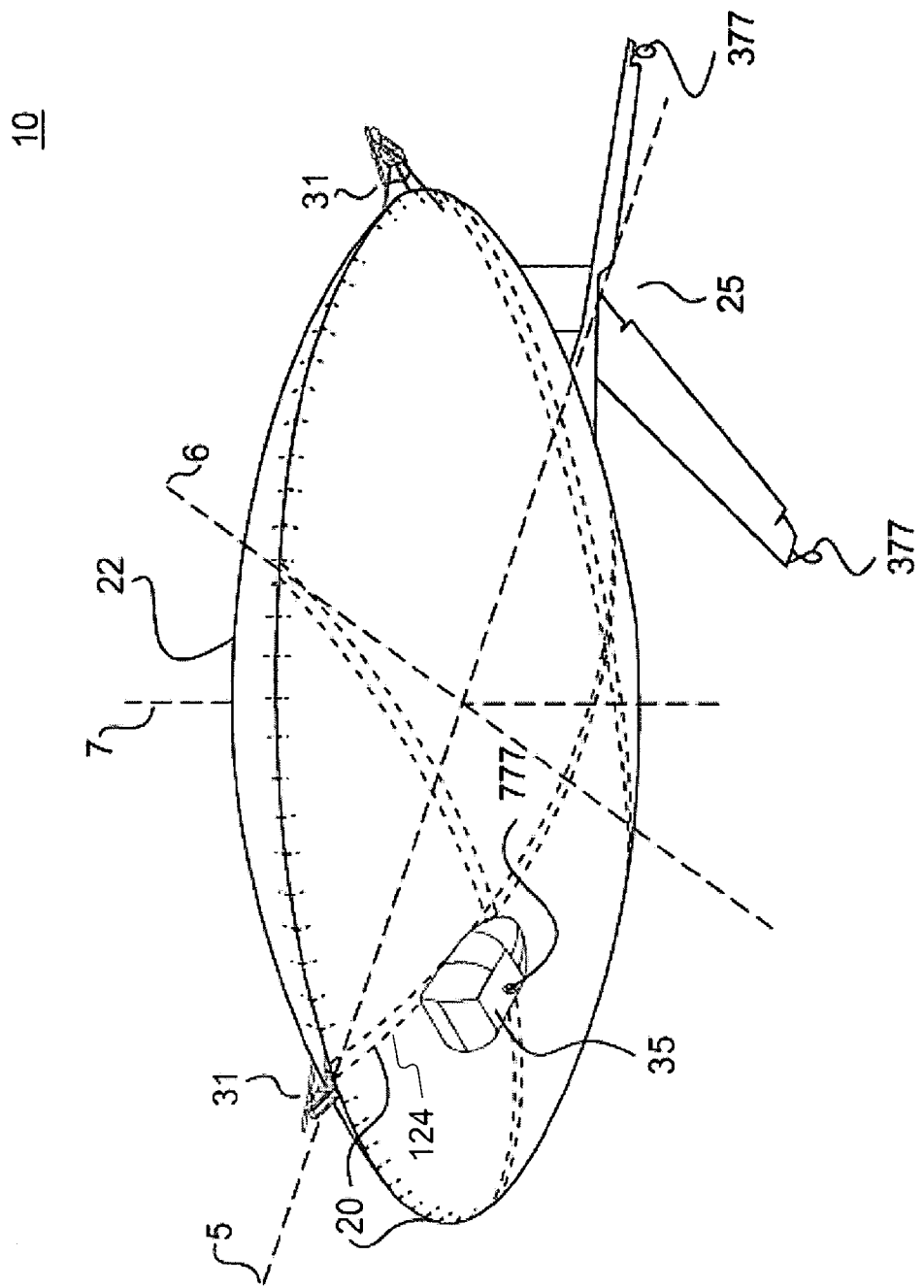
FIG. 1 is a perspective schematic view of an exemplary embodiment of a lenticular airship (LA)

FIG. 1 illustrates one exemplary embodiment of a lenticular airship (LA) 10. LA 10 may be configured for vertical take-off and landing (VTOL) as well as navigation in three dimensions (e.g., X, Y, and Z planes). To facilitate such a flight, LA 10 may include a support structure 20, a hull 22, an empennage assembly 25, rear landing gear assemblies 377, a propulsion system including propulsion assemblies 31, a gondola 35, one or more computers 600 (see, e.g., FIG. 7), and/or a front landing gear assembly 777. Throughout this discussion of various embodiments, the terms "airship" and "lenticular airship" may be used interchangeably to refer to various embodiments of LA 10. Further, the terms "front" and/or "fore" may be used to refer to areas within a hemisphere section of LA 10 closest to forward travel, and the term "rear" and/or "aft" may be used to refer to areas within a hemisphere section of LA 10 closest to the opposite direction of travel. Moreover, the term "tail" may be used to refer to a rear most point associated with hull 22, while the term "nose" may be used to refer to the forward most point within the front section of hull 22.

Support structure 20 may be configured to define a shape associated with LA 10, while providing support to numerous systems associated with LA 10. Such systems may include, for example, hull 22, gondola 35, a cargo compartment (not shown), and/or propulsion assemblies 31. Support structure 20 may be defined by one or more frame members interconnected to form a desired shape. For example, according to some embodiments, frame members at the bottom part of support structure 20 may form a bisected "H" configuration of built up graphite composite beams. For example, the frame members may be an assembly of 3-ply graphite fabric layers applied at 60 degree angles between each ply. These frame members may join with a similarly constructed rigid ring that defines the outer circumference of LA 10. The ring may be composed of a plurality of laid up composite structures that are joined together with a channel-shaped composite stiffener. Such an arrangement of the beams and the rigid ring frame may work together to carry static and dynamic loads in both compression and tension.

To maximize a lifting capacity associated with LA 10, it may be desirable to design and fabricate support structure 20 such that weight associated with support structure 20 is reduced or minimized while strength, and therefore resistance to aerodynamic forces, for example, is increased or maximized. In other words, maximizing a strength-to-weight ratio associated with support structure 20 may provide a more desirable configuration for LA 10. For example, one or more frame members may be constructed from light weight, but high strength, materials including, for example, a substantially carbon-based material (e.g., carbon fiber) and/or aluminum, among other things.

According to some embodiments, one or more frame members may be constructed, to include a carbon fiber/resin composite and honeycomb-carbon sandwich. The honeycomb-carbon sandwich may further include a carbon mousse or foam type material. In such an embodiment, individual frame members associated with support structure 20 may be fabricated in an appropriate size and shape for assembly within support structure 20. Such construction may lead to a desirable strength-to-weight ratio for support structure 20. In some embodiments, it may be desirable to fabricate support structure 20 such that an associated mass is less than, for example, 200 kilograms.

Hull 22 may include multiple layers/envelopes and/or may be of a semi-rigid construction. Further, hull 22 may be substantially oblate spheroid, or "lenticular" in shape. For example, the dimensions of an oblate spheroid shape may be approximately described by the representation A=B>C, where A is a length dimension (e.g., along roll axis 5); B is a width dimension (e.g., along pitch axis 6); and C is a height dimension (e.g., along yaw axis 7) of an object. In other words, an oblate spheroid may have an apparently circular planform with a height (e.g., a polar diameter) less than the diameter of the circular planform (e.g., an equatorial diameter). For example, according to some embodiments, hull 22 may include dimensions as follows: A=21 meters; B=21 meters; and C=7 meters. Dimensions associated with hull 22 may also define, at least in part, a volume of lighter-than-air gas that may be retained within hull 22. For example, using the dimensions given above for hull 22, an uncompressed internal volume associated with hull 22 may be approximately 1275 cubic meters. Note that these dimensions are exemplary only and larger or smaller dimensions may be implemented without departing from the scope of the present inventions. For example, hull 22 may include dimensions as follows, A=105 meters; B=105 meters, and C=35 meters.

Hull 22 may be configured to retain a volume of lighter-than-air gas and may be fabricated such that, upon retention of the volume of gas, a substantially lenticular and/or oblate spheroid shape results. Therefore, hull 22 may include a first envelope sewn or otherwise assembled of fabric or material configured to retain a lighter-than-air gas and/or having a circular planform with a maximum thickness less than the diameter of the circular planform. In some embodiments, the first envelope may be fabricated from materials including, for example, aluminized plastic, polyurethane, polyester, laminated latex, and any other material suitable for retaining a lighter-than-air gas. The first envelope may be fabricated from one or more polyester sheets and may be sewn or otherwise shaped such that retention of a volume of lighter-than-air gas causes first envelope 282 to assume the shape of an oblate spheroid.

The first envelope associated with hull 22 may be configured to be fastened to support structure 20 such that support structure 20 may provide support to hull 22. For example, the first envelope may be attached to the rim of the composite load ring to provide a continuous and smooth attachment of the upper fabric skin to LA 10. Such a design may eliminate stress concentrations caused by asymmetrical upward forces frequently encountered in conventional airship designs. In some embodiments, the fabric seams on LA 10 may run radially from the center of the helium dome to the rigid rim so that the seams can carry loads along their length.

Lighter-than-air lifting gasses for use within the first envelope of hull 22 may include, for example, helium, hydrogen, methane, and ammonia, among others. The lift force potential of a lighter-than-air gas may depend on the density of the gas relative to the density of the surrounding air or other fluid (e.g., water). For example, the density of helium at 0 degrees Celsius and 101.325 kilo-Pascals may be approximately 0.1786 grams/liter, while the density of air at 0 degrees C. and 101.325 kilo-Pascals may be approximately 1.29 g/L. Based on the lighter-than-air gas chosen, an internal volume of the first envelope associated with hull 22 may be selected such that a desired amount of lift force is generated by a volume of lighter-than-air gas.

According to some embodiments, the first envelope associated with hull 22 may be divided by a series of "walls" or dividing structures (not shown). These walls may create separated "compartments" that may each be filled individually with a lighter-than-air lifting gas. Such a configuration may mitigate the consequences of the failure of one or more compartments (e.g., a leak or tear in the fabric) such that LA 10 may still possess some aerostatic lift upon failure of one or more compartments. In some embodiments, each compartment may be in fluid communication with at least one other compartment, and such walls may be fabricated from materials similar to those used in fabrication of the first envelope, or, alternatively (or in addition), different materials may be used. For example, the "walls" may be constructed by a material that is sufficiently porous to allow the gas to slowly migrate between the separate cells to maintain an equal pressure.

One or more of the compartments within the first envelope may include one or more fill and/or relief valves (not shown) configured to allow filling of the first envelope, which may result in minimizing the risk of over-inflation of the first envelope. Such valves may be designed to allow entry of a lighter-than-air gas as well as allowing a flow of lighter-than-air gas to flow out of the first envelope upon an internal pressure reaching a predetermined value (e.g., about 150 to about 400 Pascals).

In addition to aerostatic lift generated by retention of a lighter-than-air gas, hull 22 may be configured to generate at least some aerodynamic lift when placed in an airflow (e.g., LA 10 in motion and/or wind moving around hull 22) based on an associated angle of attack and airflow velocity relative to LA 10. For example, hull 22 may include a second envelope configured to conform substantially to a shape associated with the first envelope. The second envelope associated with hull 22 may, for example, substantially surround both top and bottom surfaces of the first envelope, or alternatively, the second envelope may be formed by two or more pieces of material, each substantially covering only a portion of the top and/or bottom surface of hull 22. For example, according to some embodiments, the second envelope may closely resemble the first envelope, but contain a slightly larger volume, such that the second envelope may substantially surround support structure 20 and the first envelope associated with hull 22.

The second envelope may include canvass, vinyl, and/or other suitable material that may be sewn or otherwise crafted into a suitable shape, which may possess a desired resistance to external stresses (e.g., tears, aerodynamic forces, etc.). In some embodiments, the second envelope may include a low drag and/or low weight fabric such as, for example, polyester, polyurethane, and/or DuPont™ Tedlar®, having a thermo plastic coating.

In addition to providing aerodynamic lift force transfer to support structure 20 and potential tear resistance, upon installation of the second envelope, a space may be created between the first envelope and the second envelope, which may be utilized as a ballonet for LA 10. For example, a ballonet may be used to compensate for differences in pressure between a lifting gas within the first envelope and the ambient air surrounding LA 10, as well as for the ballasting of an airship. The ballonet may therefore allow hull 22 to maintain its shape when ambient air pressure increases (e.g., when LA 10 descends). Pressure compensation may be accomplished, for example, by pumping air into, or venting air out of, the ballonet as LA 10 ascends and descends, respectively. Such pumping and venting of air may be accomplished via air pumps, vent tabs, or other suitable devices (e.g., action of the propulsion system 30) associated with hull 22.

FIG. 1 further illustrates various axes relative to the exemplary LA 10 for reference purposes. LA 10 may define a roll axis 5, a pitch axis 6, and a yaw axis 7. Roll axis 5 of LA 10 may correspond with an imaginary line running through hull 22 in a direction from, for example, empennage assembly 25 to gondola 35. Yaw axis 7 of LA 10 may correspond with an imaginary line running perpendicular to roll axis 5 through hull 22 in a direction from, for example, a bottom surface of hull 22 to a top surface of hull 22. Pitch axis 6 may correspond to an imaginary line running perpendicular to both yaw and roll axes, such that pitch axis 6 runs through hull 22 from one side of LA 10 to the other side of LA 10. "Roll axis" and "X axis;" "pitch axis" and "Y axis;" and "yaw axis" and "Z axis" may be used interchangeably throughout this discussion to refer to the various axes associated with LA 10. One of ordinary skill in the art will recognize that the terms described in this paragraph are exemplary only and not intended to be limiting.

Yaw and pitch controls of LA 10 may determine the vertical and horizontal directions of propulsion, and ultimately determine the flight direction of LA 10.

Figure 2:
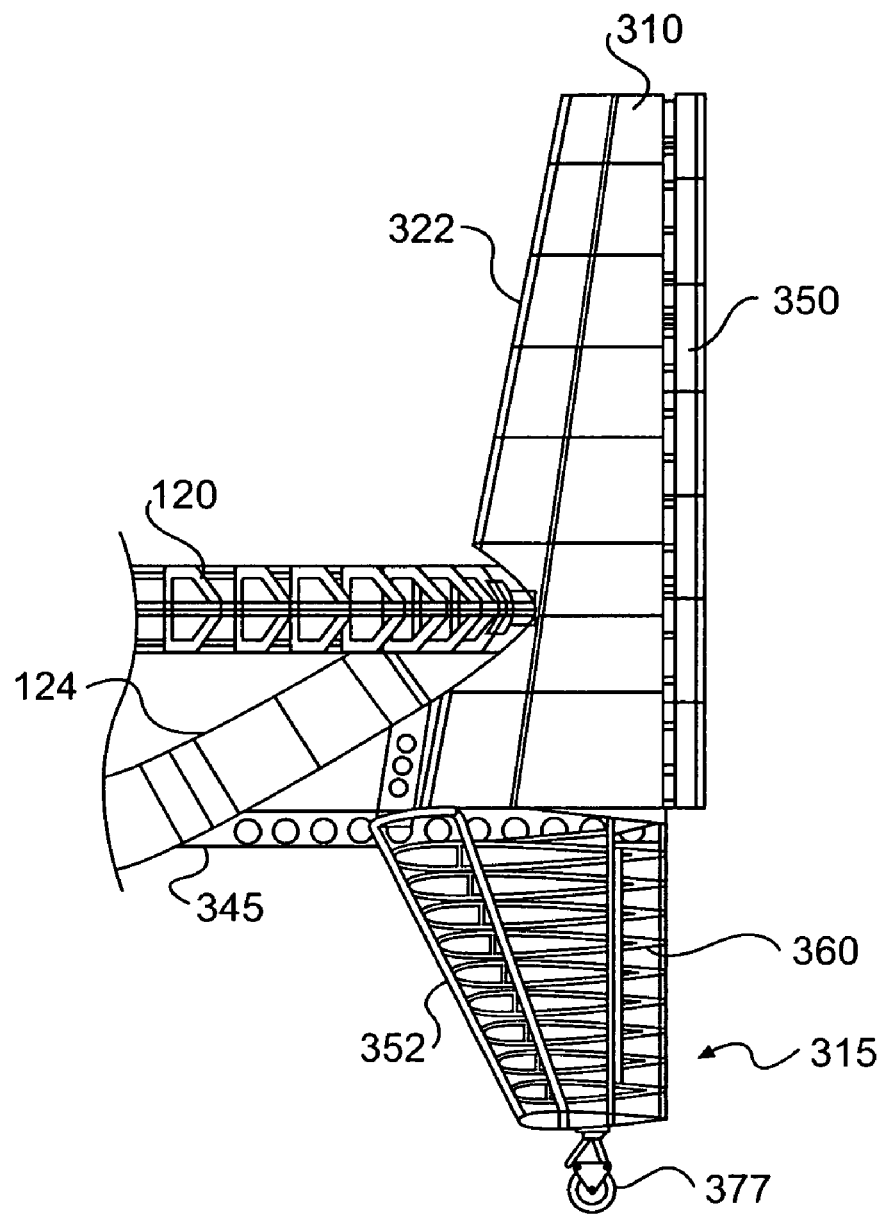
FIG. 2 is a schematic view highlighting an exemplary empennage and its exemplary horizontal control surfaces and vertical control surfaces.

FIG. 2 illustrates an exemplary empennage assembly 25. Empennage assembly 25 may be configured to provide stabilization and/or navigation functionality to LA 10. Empennage assembly 25 may be operatively connected to support structure 20 (see FIG. 1) via brackets, mounts, and/or other suitable methods. For example, in some embodiments, empennage 25 may be mounted to a keel hoop 120, and a longitudinal support member 124 associated with support structure 20, utilizing empennage mount 345. As shown in FIG. 2, keel hoop 120 may be a substantially circular peripheral beam associated with support structure 20. Keel hoop 120 may include one or more frame sections with a defined radius of curvature that may be affixed to one another to form keel hoop 120 of a desired radius. In some embodiments, keel hoop 120 may have a diameter of, for example, approximately 21 meters. Longitudinal frame member 124 may be configured to extend in a longitudinal direction from a fore portion of keel hoop 120 to a rear portion of keel hoop 120. Longitudinal frame member 124 may meet keel hoop 120 substantially orthogonally and may be aligned at substantially a midway point associated with keel hoop 120. In other words, viewing keel hoop 120 in a two dimensional plane, longitudinal frame member 124 may intersect keel hoop 120 at relative positions of 0 degrees and 180 degrees. One of ordinary skill in the art will recognize that numerous other mounting configurations may be utilized and are intended to fall within the scope of the present disclosure.

According to some embodiments, empennage assembly 25 may include a vertical stabilizing member 310. Vertical stabilizing member 310 may be configured as an airfoil to provide LA 10 with stability and assistance in yaw/linear flight control. Vertical stabilizing member 310 may include a leading edge, a trailing edge, a pivot assembly, one or more spars, and one or more vertical control surfaces 350 (e.g., a rudder).

Vertical stabilizing member 310 may be pivotally affixed to a point on empennage assembly 25. During operation of LA 10, vertical stabilizing member 310 may be directed substantially upward from a mounting point of empennage assembly 25 to support structure 20 while the upper-most point of vertical stabilizing member 310 remains below or substantially at the same level as the uppermost point on the top surface of hull 22. Such a configuration may allow vertical stabilizing member 310 to maintain isotropy associated with LA 10. Under certain conditions (e.g., free air docking, high winds, etc.), vertical stabilizing member 310 may be configured to pivot about a pivot assembly within a vertical plane such that vertical stabilizing member 310 comes to rest in a horizontal or downward, vertical direction, and substantially between horizontal stabilizing members 315. Such an arrangement may further enable LA 10 to maximize isotropy relative to a vertical axis, thereby minimizing the effects of adverse aerodynamic forces, such as wind cocking with respect to vertical stabilizing member 310. In some embodiments consistent with the present disclosure, where hull 22 includes a thickness dimension of 7 meters and where empennage assembly 25 is mounted to keel hoop 120 and longitudinal frame member 124, vertical stabilizing member 310 may have a height dimension ranging from about 3 meters to about 4 meters.

Vertical stabilizing member 310 may include one or more spars (not shown) configured to define the planform of vertical stabilizing member 310 as well as provide support for a skin associated with vertical stabilizing member 310. The one or more spars may include a substantially carbon-based material, such as, for example, a carbon fiber honeycomb sandwich with a carbon fiber mousse. Each of the one or more spars may have openings (e.g., circular cutouts) at various locations, such that weight is minimized, with minimal compromise in strength. One of ordinary skill in the art will recognize that minimizing the number of spars used, while still ensuring desired structural support may allow for minimizing weight associated with vertical stabilizing member 310. Therefore, the one or more spars may be spaced along the span of vertical stabilizing member 310 at a desired interval configured to maximize support while minimizing weight.

A leading edge 322 may be utilized for defining an edge shape of vertical stabilizing member 310 as well as securing the spars prior to installation of a skin associated with vertical stabilizing member 310. Leading edge 322 may also include a substantially carbon-based material, such as a carbon fiber honeycomb sandwich with a carbon fiber mousse.

Leading edge 322 and the one or more spars may be aligned and fastened in place with a skin installed substantially encasing leading edge 322 and spars. The skin may include, for example, canvass, polyester, nylon, thermoplastics, and/or any other suitable material. The skin may be secured using adhesives, shrink wrap methods, and/or any other suitable method for securing the skin to leading edge 322 and the one or more spars.

For example, in some embodiments, a canvass material may be applied over the one or more spars and leading edge 322 then secured using an adhesive and/or other suitable fastener. The canvass material may then be coated with a polyurethane and/or thermoplastic material to further increase strength and adhesion to the one or more spars and leading edge 322.

Vertical stabilizing member 310 may also include one or more vertical control surfaces 350 configured to manipulate airflow around vertical stabilizing member 310 for purposes of controlling LA 10. For example, vertical stabilizing member 310 may include a rudder configured to exert a side force on vertical stabilizing member 310 and thereby, on empennage mount 345 and hull 22. Such a side force may be used to generate a yawing motion about yaw axis 7 of LA 10, which may be useful for compensating aerodynamic forces during flight. Vertical control surfaces 350 may be operatively connected to vertical stabilizing member 310 (e.g., via hinges) and may be communicatively connected to systems associated with gondola 35 (e.g., yaw controls) or other suitable locations and systems. For example, communication may be established mechanically (e.g., cables) and/or electronically (e.g., wires and servo motors and/or light signals) with gondola 35 or other suitable locations (e.g., remote control).

Horizontal stabilizing members 315 associated with empennage assembly 25 may be configured as airfoils and may provide horizontal stability and assistance in pitch control of LA 10, among other things. Horizontal stabilizing members 315 may include a leading edge, a trailing edge, one or more spars, and one or more horizontal control surfaces 360 (e.g., elevators).

In some embodiments, horizontal stabilizing members 315 may be mounted on a lower side of hull 22 in an anhedral (also known as negative or inverse dihedral) configuration. In other words, horizontal stabilizing members 315 may extend away from vertical stabilizing member 310 at a downward angle relative to roll axis 5. The anhedral configuration of horizontal stabilizing members 315 may allow horizontal stabilizing members 315 to act as ground and landing support for a rear section of LA 10. Alternatively, horizontal stabilizing members 315 may be mounted in a dihedral or other suitable configuration.

According to some embodiments, horizontal stabilizing members 315 may be operatively affixed to empennage mount 345 and/or vertical stabilizing member 310. Under certain conditions (e.g., free air docking, high winds, etc.) horizontal stabilizing members 315 may be configured to allow vertical stabilizing member 310 to pivot within a vertical plane, such that vertical stabilizing member 310 comes to rest substantially between horizontal stabilizing members 315.

In some embodiments, a span (i.e., tip-to-tip measurement) associated with horizontal stabilizing members 315 may be approximately 10 to 20 meters across, depending on a desired size of hull 22. In some embodiments, a span associated with horizontal stabilizing members 315 may be, for example, approximately 14.5 meters. One of ordinary skill in the art will recognize that such a span may be larger or smaller depending on characteristics of a particular embodiment. For example, a ratio of hull diameter to span may be in a range of between approximately 1.6:1 and 1:1.

Horizontal stabilizing members 315 may include one or more spars (not shown) configured to define the planform of horizontal stabilizing members 315 as well as provide support for a skin associated with horizontal stabilizing members 315. The one or more spars may include a substantially carbon-based material, such as a carbon fiber honeycomb sandwich with a carbon fiber mousse. Each of the one or more spars may have openings (e.g., circular cutouts) at various locations, such that weight is minimized with minimal compromise in strength. One of ordinary skill in the art will recognize that minimizing the number of spars used, while still ensuring desired structural support may allow for minimizing weight associated with horizontal stabilizing members 315. Therefore, spars may be spaced along the span of horizontal stabilizing members 315 at a desired interval configured to maximize support while minimizing weight.

A leading edge 352 may be utilized for defining an edge shape of horizontal stabilizing members 315 as well as securing each spar prior to installation of a skin associated with horizontal stabilizing members 315. Leading edge 352 may also include a substantially carbon-based material, such as a carbon fiber honeycomb sandwich with a carbon fiber mousse to obtain a desirable strength-to-weight ratio. Once leading edge 352 and the one or more spars have been aligned and fastened in place, a skin may be installed substantially encasing leading edge 352 and the one or more spars. Skin materials may include, for example, canvass, polyester, nylon, thermoplastics, and/or any other suitable material. The skin may be secured using adhesives, shrink wrap methods, and/or any other suitable method. For example, in some embodiments, a canvass material may be applied over the one or more spars and leading edge 352 and secured using an adhesive, and/or other suitable fastener. The canvass material may then be coated with a polyurethane and/or thermoplastic material to further increase strength and adhesion to spars and leading edge 352.

Horizontal stabilizing members 315 may also include one or more horizontal control surfaces 360 (e.g., elevators) configured to manipulate airflow around horizontal stabilizing members 315 to accomplish a desired effect. For example, horizontal stabilizing members 315 may include elevators configured to exert a pitching force (i.e., up or down force), and/or a rolling force on horizontal stabilizing members 315. A pitching force may be used to cause motion of LA 10 about pitch axis 6, while a rolling force may be used to cause motion of LA 10 about roll axis 5. Horizontal control surfaces 360 may be operatively connected to horizontal stabilizing members 315 (e.g., via hinges) and may be mechanically (e.g., via cables) and/or electronically (e.g., via wires and servo motors and/or light signals) controlled from gondola 35 or other suitable location (e.g., remote control).

Figure 3B:
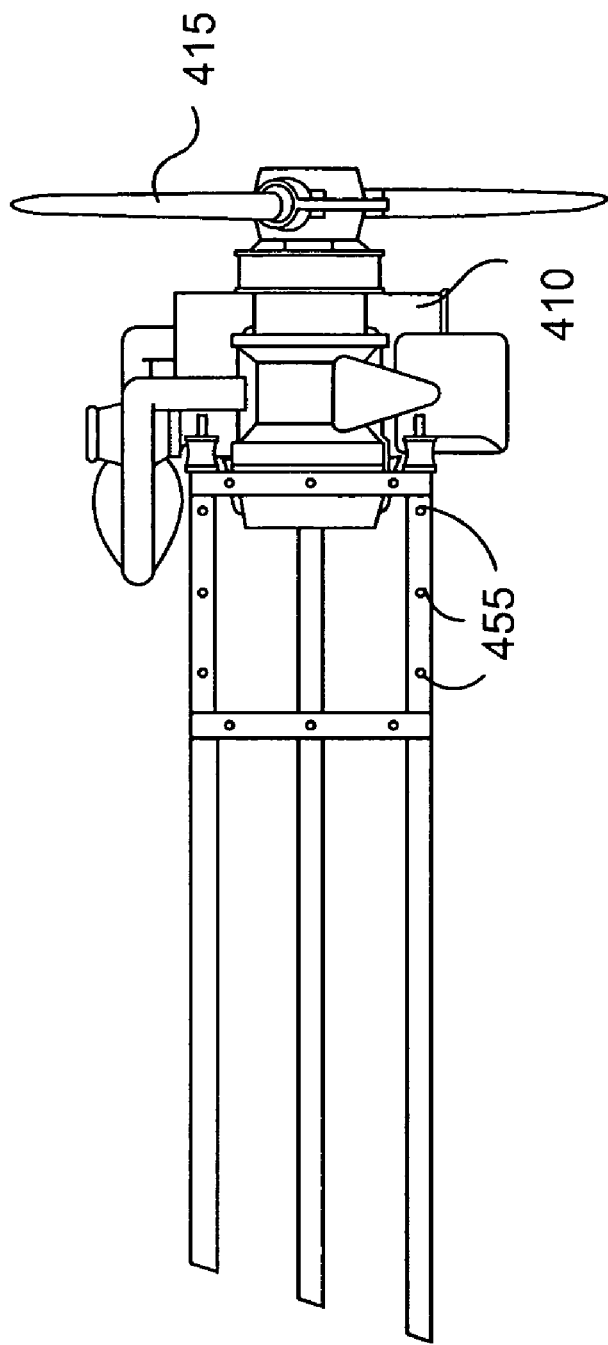
FIG. 3B is a schematic, partial perspective view of an exemplary embodiment of a thrust propulsion assembly.

FIGS. 3A and 3B illustrate two exemplary embodiments of propulsion assemblies 31. For example, as shown in FIG. 3A, propulsion assemblies 31 may include a power source 410, a power conversion unit 415, a propulsion unit mount 430, and/or a fuel source (e.g., a tank) (not shown). Power source 410 may include, for example, electric motors, liquid fuel motors, gas turbine engines, and/or any suitable power source configured to generate rotational power. Power source 410 may further include variable-speed and/or reversible type motors that may be run in either direction (e.g., rotated clockwise or counterclockwise) and/or at varying rotational speeds based on control signals (e.g., signals from computer 600, shown in FIG. 7). Power source 410 may be powered by batteries, solar energy, gasoline, diesel fuel, natural gas, methane, and/or any other suitable fuel source. In some embodiments, for example, power source 410 may include a Mini 2 and/or a Mini 3 motor manufactured by Simonini Flying, Via per Marano, 4303, 41010—San Dalmazio di Serramazzoni (MO), Italy.

According to some embodiments, propulsion assemblies 31 may include a power conversion unit 415 configured to convert the rotational energy of power source 410 into a thrust force suitable for acting on LA 10. For example, power conversion unit 415 may include an airfoil or other device that when rotated may generate an airflow or thrust. For example, power conversion unit 415 may be arranged as an axial fan (e.g., propeller), a centrifugal fan, and/or a tangential fan. Such exemplary fan arrangements may be suited to transforming rotational energy produced by power source 410 into a thrust force useful for manipulating LA 10, among other things. Alternatively, where a power source such as a gas turbine engine is utilized, thrust may be provided without use of power conversion unit 415. One of ordinary skill in the art will recognize that numerous configurations may be utilized without departing from the scope of the present disclosure.

Power conversion unit 415 may be adjustable such that an angle of attack of power conversion unit 415 may be modified. This may allow for modification to thrust intensity and direction based on the angle of attack associated with power conversion unit 415. For example, where power conversion unit 415 is configured as an adjustable airfoil (e.g., variable-pitch propellers), power conversion unit 415 may be rotated through 90 degrees to accomplish a complete thrust reversal. Power conversion unit 415 may be configured with, for example, vanes, ports, and/or other devices, such that a thrust generated by power conversion unit 415 may be modified and directed in a desired direction. Alternatively (or in addition), direction of thrust associated with power conversion unit 415 may be accomplished via manipulation of propulsion unit mount 430.

As shown in FIG. 3A, for example, propulsion unit mount 430 may be operatively connected to support structure 20 (see FIG. 1) and may be configured to hold a power source 410 securely, such that forces associated with propulsion assemblies 31 may be transferred to support structure 20. For example, propulsion unit mount 430 may include fastening points 455 (FIGS. 3A and 3B) designed to meet with a fastening location on keel hoop 120, horizontal stabilizing members 315, lateral frame member (not shown), and/or any other suitable location. Such locations may include structural reinforcement for assistance in resisting forces associated with propulsion assemblies 31 (e.g., thrust forces). Additionally, propulsion unit mount 430 may include a series of fastening points designed to match fastening points on a particular power source 410. One of ordinary skill in the art will recognize that an array of fasteners may be used for securing fastening points to obtain a desired connection between propulsion unit mount 430 and a fastening location.

Figure 7:
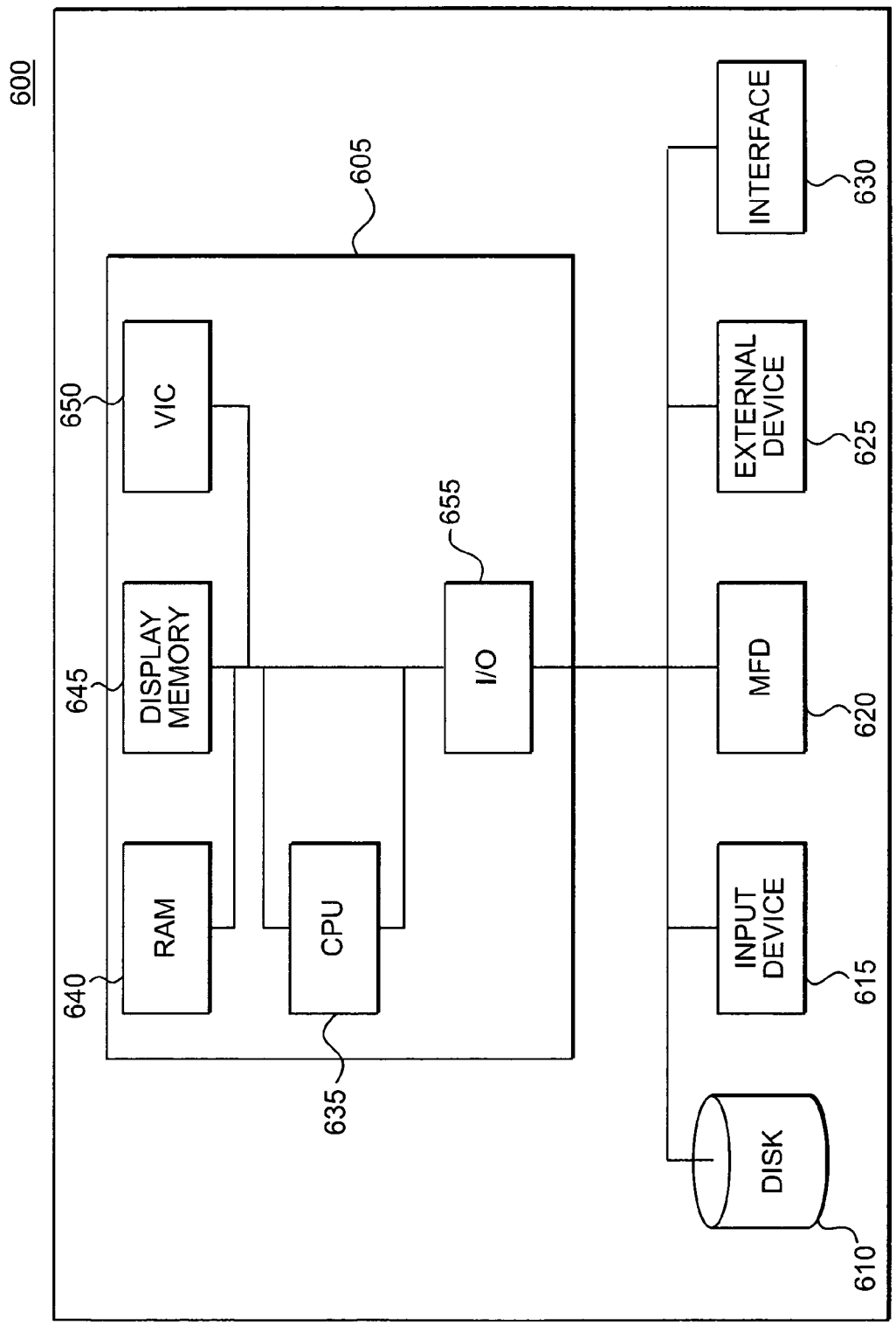
FIG. 7 is a block diagram of an exemplary embodiment of a flight computer.

According to some embodiments, propulsion unit mount 430 may include pivot assemblies configured to allow a rotation of propulsion assemblies 31 about one or more axes (e.g., axes 465 and 470) in response to a control signal provided by, for example, computer 600 (see, e.g., FIG. 7). Pivot assemblies may include worm gears, bevel gears, bearings, motors, and/or other devices that may facilitate controlled rotation about one or more axes of propulsion assemblies 31. In such embodiments, an electric motor may be configured to cause rotation of an associated worm gear and the rotation of worm gear may then cause rotation of propulsion mount gear, thereby rotating propulsion mount 430.

Alternatively, in some embodiments, propulsion assemblies 31 may be mounted such that minimal rotation or pivoting may be enabled (e.g., substantially fixed) as shown in FIG. 3B. Such a configuration may be utilized for one or more of propulsion assemblies 31, as desired.

Figure 4A:
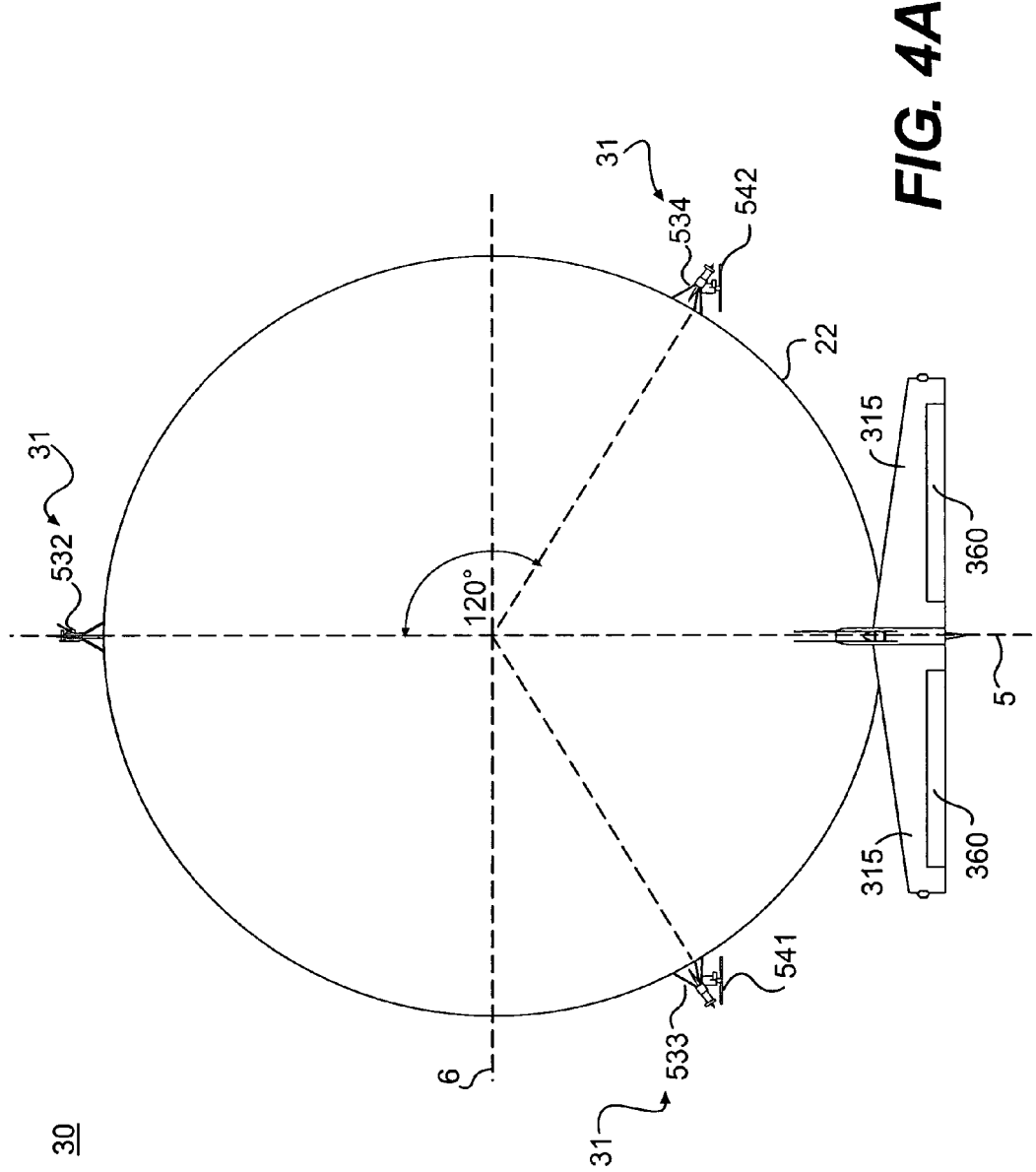
FIG. 4A is a schematic, plan, bottom-side view of an exemplary embodiment of an arrangement of propulsion systems associated with an exemplary LA.
Figure 4B:
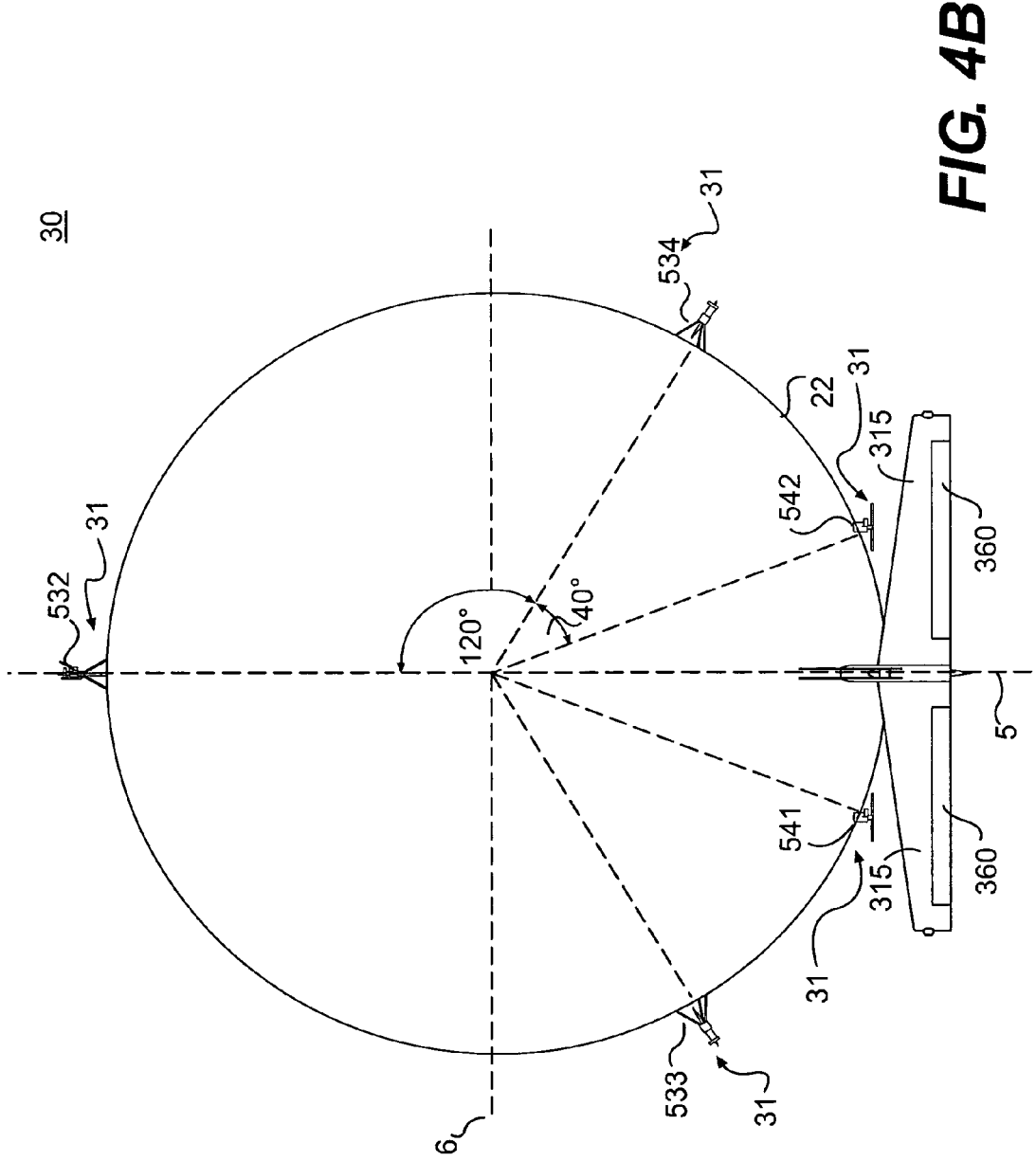
FIG. 4B is a schematic, plan, bottom-side view of another exemplary embodiment of an arrangement of propulsion systems associated with an exemplary LA.

FIGS. 4A and 4B illustrate exemplary configurations (viewed from the bottom of LA 10) of a propulsion system associated with LA 10 consistent with the present disclosure. Propulsion assemblies 31 associated with LA 10 may be configured to provide a propulsive force (e.g., thrust), directed in a particular direction (i.e., a thrust vector), and configured to generate motion (e.g., horizontal motion and/or vertical motion), counteract a motive force (e.g., wind forces), and/or other manipulation of LA 10 (e.g., yaw control). For example, propulsion assemblies 31 may enable yaw, pitch, and roll control as well as providing thrust for horizontal and vertical motion. Such functionality may depend on placement and power associated with propulsion assemblies 31.

Functions associated with propulsion system 30 may be divided among a plurality of propulsion assemblies 31 (e.g., 5 propulsion assemblies 31). For example, propulsion assemblies 31 may be utilized for providing a lift force for a vertical take-off such that the forces of the lighter-than-air gas within the first envelope of hull 22 are assisted in lifting by a thrust force associated with the propulsion assemblies 31. Alternatively (or in addition), propulsion assemblies 31 may be utilized for providing a downward force for a landing maneuver such that the forces of the lighter-than-air gas within the first envelope of hull 22 are counteracted by a thrust force associated with the propulsion assemblies 31. In addition, horizontal thrust forces may also be provided by propulsion assemblies 31 for purposes of generating horizontal motion (e.g., translation with respect to the ground) associated with LA 10.

It may be desirable to utilize propulsion assemblies 31 for controlling or assisting in control of yaw, pitch, and roll associated with LA 10. In some embodiments, LA 10 may include one or more lift propulsion assemblies, such as those shown at FIG. 3A, configured to provide vertical lifting thrust, and one or more horizontal propulsion assemblies, such as those shown at FIG. 3B, configured to provide horizontal propulsion thrust. These vertical and horizontal propulsion assemblies may be controlled by the operator in a coordinated manner to balance the vertical lifting component, horizontal direction, and angle of LA 10.

For example, as shown in FIG. 4A, propulsion system 30 may include a fore propulsion assembly 532 operatively affixed to a fore section of keel hoop 120 (see FIG. 1) and substantially parallel to and/or on roll axis 5 of LA 10. In addition to fore propulsion assembly 532, propulsion system 30 may include a starboard propulsion assembly 533 operatively affixed to keel hoop 120 at approximately 120 degrees relative to roll axis 5 of LA 10 and a port propulsion assembly 534 operatively affixed to keel hoop 120 at approximately negative 120 degrees (e.g., positive 240 degrees) relative to roll axis 5 of LA 10. Such a configuration may enable control of yaw, pitch, and roll associated with LA 10. For example, where it is desired to cause a yawing movement of LA 10, fore propulsion assembly 532 may be rotated or pivoted such that a thrust vector associated with fore propulsion assembly 532 is directed parallel to pitch axis 6 and to the right or left relative to hull 22, based on the desired yaw. Upon operation of fore propulsion assembly 532, LA 10 may be caused to yaw in reaction to the directed thrust associated with fore propulsion assembly 532.

In other exemplary embodiments, for example, where it is desired to cause a pitching motion associated with LA 10, fore propulsion assembly 532 may be rotated such that a thrust force associated with fore propulsion assembly 532 may be directed parallel to yaw axis and toward the ground (i.e., down) or toward the sky (i.e., up), based on the desired pitch. Upon operation of fore propulsion assembly 532, LA 10 may then be caused to pitch in reaction to the directed thrust associated with fore propulsion assembly 532.

According to still other embodiments, for example, where it is desired to cause a rolling motion associated with LA 10, starboard propulsion assembly 533 may be rotated such that a thrust force associated with starboard propulsion assembly 533 may be directed parallel to yaw axis 7 and toward the ground (i.e., down) or toward the sky (i.e., up) based on the desired roll. Additionally, or alternatively, port propulsion assembly 534 may be rotated such that a thrust force associated with port propulsion assembly 534 may be directed in a direction opposite from the direction of the thrust force associated with starboard propulsion assembly 533. Upon operation of starboard propulsion assembly 533 and port propulsion assembly 534, LA 10 may then be caused to roll in reaction to the directed thrusts. One of ordinary skill in the art will recognize that similar results may be achieved using different combinations and rotations of propulsion assemblies 31 without departing from the scope of the present disclosure. Further, one of ordinary skill in the art will recognize that starboard propulsion assembly 533 and port propulsion assembly 534 may, in some embodiments, be fixed (i.e., not rotatable) in a position so as to direct thrust substantially parallel to yaw axis 7.

Fore, starboard, and port propulsion assemblies 532, 533, and 534 may also be configured to provide thrust forces for generating forward or reverse motion of LA 10. For example, starboard propulsion unit 533 may be mounted to propulsion mount 430 (see FIG. 3A) and configured to pivot from a position in which an associated thrust force is directed in a downward direction (i.e., toward the ground) to a position in which the associated thrust force is directed substantially parallel to roll axis 5 and toward the rear of LA 10. This may allow starboard propulsion unit 533 to provide additional thrust to supplement thrusters. Alternatively, starboard propulsion unit 534 may be rotated from a position in which an associated thrust force is directed substantially parallel to roll axis 5 and toward the rear of LA 10, to a position where the associated thrust force is directed along pitch axis 6 such that an adverse wind force may be counteracted.

In some embodiments, fore, starboard, and port propulsion assemblies 532, 533, and 534 may be mounted high up on keel hoop 120. Such a mounting structure may provide several advantages over ones that mount the propulsion assemblies much lower. For example, it may present little safety concern to inadvertent injury to ground personnel or damage to ground equipment. The noise levels of the propulsion assemblies as perceived inside LA 10 may be lower compared to those mounted on the sides of gondola 35. The mounting locations of port propulsion assemblies 532, 533, and 534 may also allow the propellers to operate in free stream air mostly unimpeded by the proximity of hull 22.

In addition to fore, starboard, and port propulsion assemblies 532, 533, and 534, respectively, propulsion system 30 may include one or more starboard thrusters 541 and one or more port thruster 542 (see FIG. 4B) configured to provide horizontal thrust forces to LA 10. Starboard and port thrusters 541 and 542 may be mounted to keel hoop 120, lateral frame members (not shown), horizontal stabilizing members 315, or any other suitable location associated with LA 10. Starboard and port thrusters 541 and 542 may be mounted using an operative propulsion unit mount 430 similar to that described above, or, alternatively, starboard and port thrusters 541 and 542 may be mounted such that minimal rotation or pivoting may be enabled (e.g., substantially fixed) as shown in FIG. 3B. For example, starboard and port thrusters 541 and 542 may be mounted to keel hoop 120 at an aft location on either side of vertical stabilizing member 310 (e.g., at approximately 160 degrees and negative 160 degrees, as shown in FIG. 4B). In some embodiments, starboard and port thrusters 541 and 542 may be substantially co-located with starboard and port propulsion assemblies 533 and 534 as described above (e.g., positive 120 degrees and negative 120 degrees). In such embodiments, propulsion unit mounts 430 associated with starboard and port propulsion assemblies 533 and 534 may include additional fastening points such that propulsion unit mounts 430 associated with starboard and port thrusters 541 and 542 may be operatively connected to one another. Alternatively, propulsion unit mounts 430 associated with starboard and port thrusters 541 and 542 may be operatively connected to substantially similar fastening points on support structure 20 as fastening points connected to propulsion unit mounts 430 associated with starboard and port propulsion assemblies 533 and 534.

In some embodiments, thrust from starboard and port thrusters 541 and 542 may be directed along a path substantially parallel to roll axis 5. Such a configuration may enable thrust forces associated with starboard and port thrusters 541 and 542 to drive LA 10 in a forward or reverse direction based on the thrust direction, as well as provide forces about yaw axis 7, among others. For example, starboard thruster 541 may be caused to generate a greater thrust force than port thruster 542. Upon such occurrence, LA 10 may be cause to rotate about yaw axis 7. Similarly, port thruster 542 may be caused to generate a greater thrust force than starboard thruster 541, causing similar rotation about yaw axis 7.

In some embodiments, thrust from starboard and port thrusters 541 and 542 may be configurable based on a position of associated propulsion unit mount 430. One of ordinary skill in the art will recognize that additional configurations for starboard and port thrusters 541 and 542 may be utilized without departing from the scope of this disclosure.

Note that in the following disclosure, power conversion units 415 are discussed as comprising propellers (i.e., axial fans). While the systems and methods described herein are applicable to power conversion units 415 comprising variable pitch propellers, one of skill in the art will recognize that other power conversion units may also be implemented (e.g., centrifugal fan) without departing from the scope of the present invention. Any power source/power conversion unit configured to generate variable thrust may be controlled through systems and methods of the present disclosure.

Figure 5A:
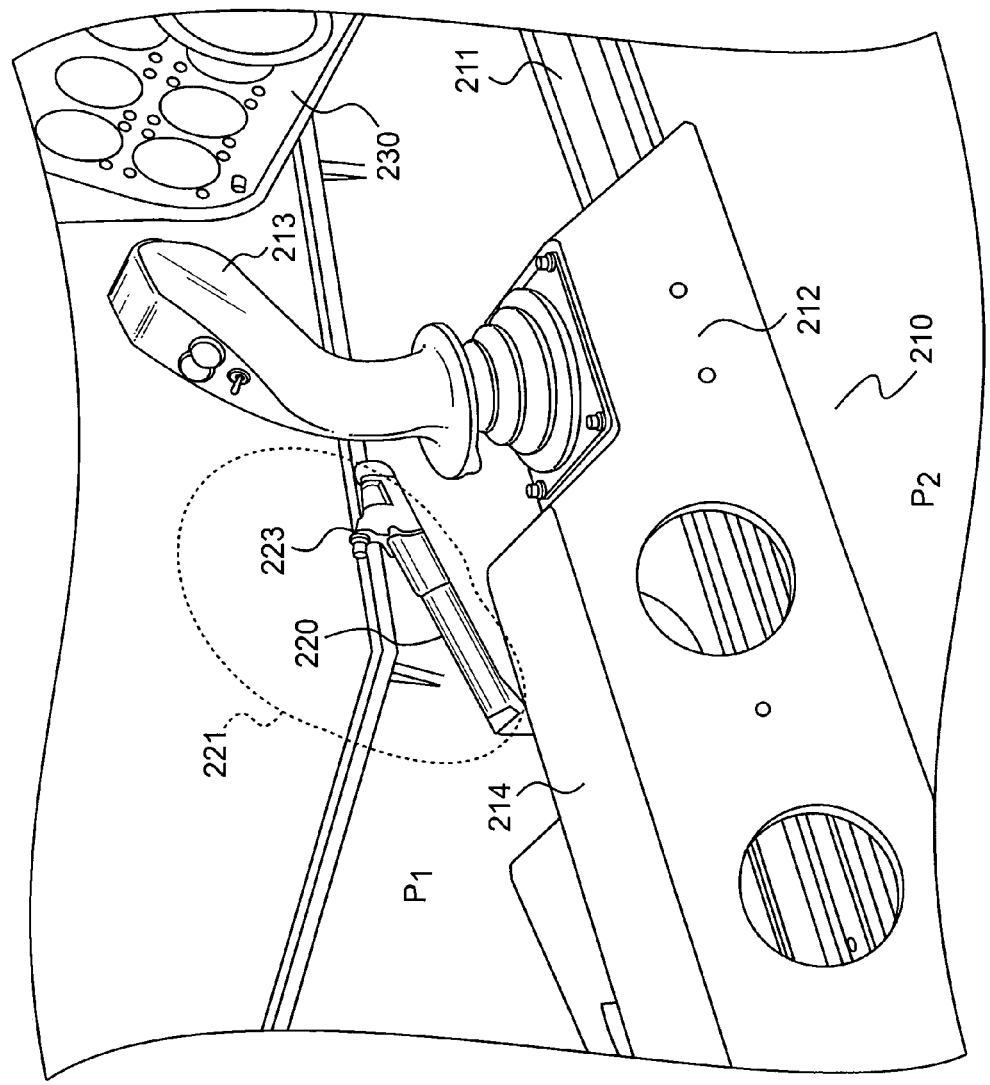
FIG. 5A is a schematic, partial perspective view of an exemplary gondola associated with an exemplary LA, showing an exemplary slider control and an exemplary collective pitch control.

FIG. 5A is a schematic, partial perspective view of an exemplary gondola 35 associated with LA 10. Gondola 35 may include, among other things, a computer 600 (see, e.g., FIG. 7), one or more operator interfaces, and/or ballast (not shown). Gondola 35 may be positioned to allow the static equilibrium of LA 10 to be maintained. For example, gondola 35 may be configured to be mounted at a location on longitudinal frame member 124 (see FIG. 1) such that a static equilibrium associated with LA 10 may be maintained. Gondola 35 may be mounted, for example, at a location along roll axis 5, such that a moment about pitch axis 6 associated with the mass of gondola 35 substantially counteracts a moment about pitch axis 6 associated with the mass of empennage assembly 25. Gondola 35 may be mounted at a location along pitch axis 6 such that no moment about roll axis 5 results from the mass of gondola 35. Alternatively, and based on factors related to aerodynamics, among others, moments associated with gondola 35 and empennage assembly 25 about pitch axis 6 may be adjusted to provide desired aerodynamic characteristics. One of ordinary skill in the art will recognize that numerous adjustments may be made as desired without departing from the scope of the present disclosure.

Gondola 35 may seat the operator and at least one passenger, and may carry additional items (e.g., alignment ballast). Gondola 35 may include one or more operator interfaces configured to provide a location for an operator or other individual to perform tasks associated with flying LA 10. For example, as shown in FIG. 5A, gondola 35 may include a slider control 210, a collective pitch control 221, and navigation instruments 230, among other things (e.g., seating, etc.).

Slider control 210 may be mounted in a runner and may be configured to control trim and to maneuver horizontally. Consistent with the current disclosure, a runner may be a device in or on which another component slides or moves, such as, for example, frame 211. Collective pitch control 221 may be mounted to a chassis associated with gondola 35 and be configured to control vertical flight and lift, among other things. Slider control 210 and collective pitch control 221 may be configured to provide an operator of LA 10 with controls enabling control of LA 10 during taxiing, flight, and landing. Slider control 210 and collective pitch control 221 may be communicatively connected to computer 600, vertical and horizontal control surfaces 350 and 360 (FIG. 2), propulsion assemblies 31, and other systems as desired (FIG. 1). Further, slider control 210 and collective pitch control 221 may receive inputs indicative of desired navigation functions (e.g., turn, yaw, pitch, lift, etc.) from an operator and provide such inputs to computer 600, vertical and/or horizontal control surfaces 350 and 360, propulsion assemblies 31, or other suitable systems configured to cause LA 10 to be manipulated as desired by the operator.

According to some embodiments, gondola 35 may include a P1 position for an operator and a P2 position for a passenger and/or operator. Slider control 210 may be positioned in the center of gondola 35 between the P1 and P2 positions. Slider control 210 may include, among other things, a frame 211, a sliding support controller 212, and a joystick 213 affixed to sliding support controller 212. Frame 211 and sliding support controller 212 may be configured to allow sliding of sliding support controller 212 upon frame 211. In some embodiments, frame 211 may be configured to provide an output indicative of an offset of sliding support controller 212 from a predetermined neutral position. For example, the neutral position may be a position of sliding support controller 212 that corresponds to an idle throttle associated with propulsion assemblies 31 (e.g., starboard and port thrusters, 541 and 542 (FIGS. 4A and 4B), respectively) and/or a substantially neutral propeller pitch associated with the propulsion assemblies 31. In such an example, upon forward or backward movement of sliding support controller 212, propeller pitch and/or throttle may be adjusted for various propulsion assemblies 31 (e.g., starboard and port thrusters, 541 and 542, respectively) to a setting configured to obtain thrust to advance in a desired direction or slow down.

Sliding support controller 212 may further include a central armrest 214 slidably connected to frame 211. For example, the upper and side surfaces of central armrest 214 located between the P1 and P2 seats may slide forward and backward along frame 211. Upon the sliding of central armrest 214, frame 211 may provide a signal to computer 600, indicating an offset from a neutral position associated with sliding support controller 212. In some embodiments, sliding support controller 212 may include other support type structures (e.g., a head rest).

As shown in FIG. 5A, joystick 213 may be installed on one end of sliding support controller 212 located between the P1 and P2 positions. Joystick 213 may move with central armrest 214 as central armrest 214 slides forward and backward along frame 211. For example, an operator in the P1 position may use his right hand to control joystick 213 and may also slide his right arm forward or backward to control sliding support controller 212. Similarly, an operator in the P2 position may perform such operations using his left hand and arm on joystick 213 and sliding support controller 212, respectively.

Among other things, slider control 210 may control a propeller pitch associated with propulsion assemblies 31 (e.g., fore propulsion assembly 532, starboard propulsion assembly 533, port propulsion assembly 534, starboard thruster 541, and port thruster 542) and/or power source power settings (e.g., throttle). According to some embodiments, the pitch of the propellers associated with the propulsion assemblies 31 may be controlled by sliding of sliding support controller 212. The sliding control via slider control 210 may allow the operator to keep his hands and/or feet on the primary controls, while still enabling him to change propulsive forces associated with LA 10 (e.g., modifying propeller pitch associated with propulsion assemblies 31 to cause movement of LA 10 forward or backward).

In some embodiments, sliding support controller 212 may have a neutral position corresponding to throttle idle and a neutral, or substantially neutral, propeller pitch associated with propulsion assemblies 31. An offset from the neutral position associated with sliding support controller 212 may correspond to a predetermined value for a control signal. Such values may be stored in a lookup table or other associated data structure related to computer 600. The control signal may be configured to cause a modification to flight parameters associated with LA 10 based on the value. In some embodiments, the flight parameters may include a velocity associated with LA 10. In such embodiments, the control signal may be similar to a throttle control and be configured to cause a modification to at least one of a propeller pitch and a power source output associated with one or more propulsion assemblies 31. In some embodiments, the control signal may be a pitch control signal, and may cause the modification of horizontal control surfaces 360 and/or one or more propulsion assemblies 31 associated with LA 10 to affect a modification in position of LA 10 about pitch axis 6. The correspondence and ratio of interaction between such components can be determined and set before each flight, or alternatively may be predetermined prior to or during construction of LA 10.

For example, sliding support controller 212 may be communicatively connected to a propulsion propeller pitch control system of LA 10. Upon movement of sliding support controller 212, the offset associated with sliding support controller 212 may be communicated to the propulsion propeller pitch control system and the propeller pitch and/or power source power output may be changed proportionally to the amount of offset and the predetermined ratio. In such an example, upon movement of sliding support controller 212, the propeller pitch may increase and/or the throttle may open to a setting configured to obtain thrust to advance in a desired direction. Similarly, backward movement of sliding support controller 212 may put the propellers into reverse pitch and/or adjust the throttle accordingly, which may allow LA 10 to slow down and, if desired, to move in a direction aft of LA 10. One of skill in the art will recognize that the proportional control provided by slider control 210 may be implemented using any number of devices, such as a digital proportional controller.

According to some embodiments, joystick 213 may be mounted on sliding support controller 212. Joystick 213 may be angularly movable around a first axis, a second axis, and any combination of positions between the first and second axes. For example, joystick 213 may be moved perpendicular to the first axis, perpendicular to the second axis, or at various angles to each axis. Movement of joystick 213 around the first axis may control a pitch motion of LA 10, whereas movement of joystick 213 around the second axis may control a roll motion of LA 10. In other words, when joystick 213 is moved around the first axis, propulsion assemblies 31 may operate in conjunction with horizontal control surfaces 360 to cause a modification in pitch of LA 10 about pitch axis 6. When joystick 213 is moved around the second axis, propulsion assemblies 31 may be actuated accordingly to cause a modification in roll of LA 10 about roll axis 5. In some embodiments, horizontal control surfaces 360 may also be actuated in conjunction with, or separately from, propulsion assemblies to cause a modification in roll of LA 10 about roll axis 5. One of ordinary skill in the art will recognize that various combinations of elements associated with LA 10 may be implemented to cause the desired pitch and/or roll response. In addition, by virtue of its position on sliding support controller 212, joystick 213 may also assist in control of forward and/or backward (e.g., slowing) motions of LA 10 by controlling starboard and port thrusters 541 and 542, among other things.

FIG. 5A also shows an exemplary collective pitch control 221, which may include, for example, one or more collective pitch levers 220 and lock button 223. Collective pitch levers 220 may be located at a left side of the P1 seat and/or at a right side of the P2 seat (not shown). Collective pitch control levers 220 may be cross-connected, or alternatively may operate independently.

Collective pitch control 221 may operate to substantially synchronize pitch between multiple propulsion assemblies 31. For example, collective pitch lever 220 may be operated variably to control a propeller pitch associated with all three peripheral power sources (i.e., fore propulsion assembly 532, starboard propulsion assembly 533, and port propulsion assembly 534 (see FIGS. 4A and 4B)), which may thereby provide variable, controllable lift. Such controllable lift may be useful for achieving substantially level flight, vertical take-off, and landing, among others. This capability also may be provided by, among other things, variations in the propeller pitch, power output of the peripheral power sources, and operation of one or more control surfaces.

In some embodiments, the handle of collective pitch lever 220 may be provided with a locking mechanism to enable a "set it and forget it" type functionality. In some embodiments, such functionality may be implemented via a twist grip facility, which may allow an operator to achieve stable level flight and then to twist the lock on to hold the collective function at the desired degree of propeller pitch. Alternatively, locking may be accomplished via a lock button 223, such that upon achieving a desired position for collective pitch lever 220, lock button 223 may be depressed and collective pitch lever 220 locked in place. Upon depressing lock button 223 a second time, collective pitch lever 220 may be released from its position. Providing such functionality may reduce operator workload and/or fatigue when there may be little or no need to exert effort continuously on collective pitch lever 220 (e.g., in straight and level flight).

Figure 5B:
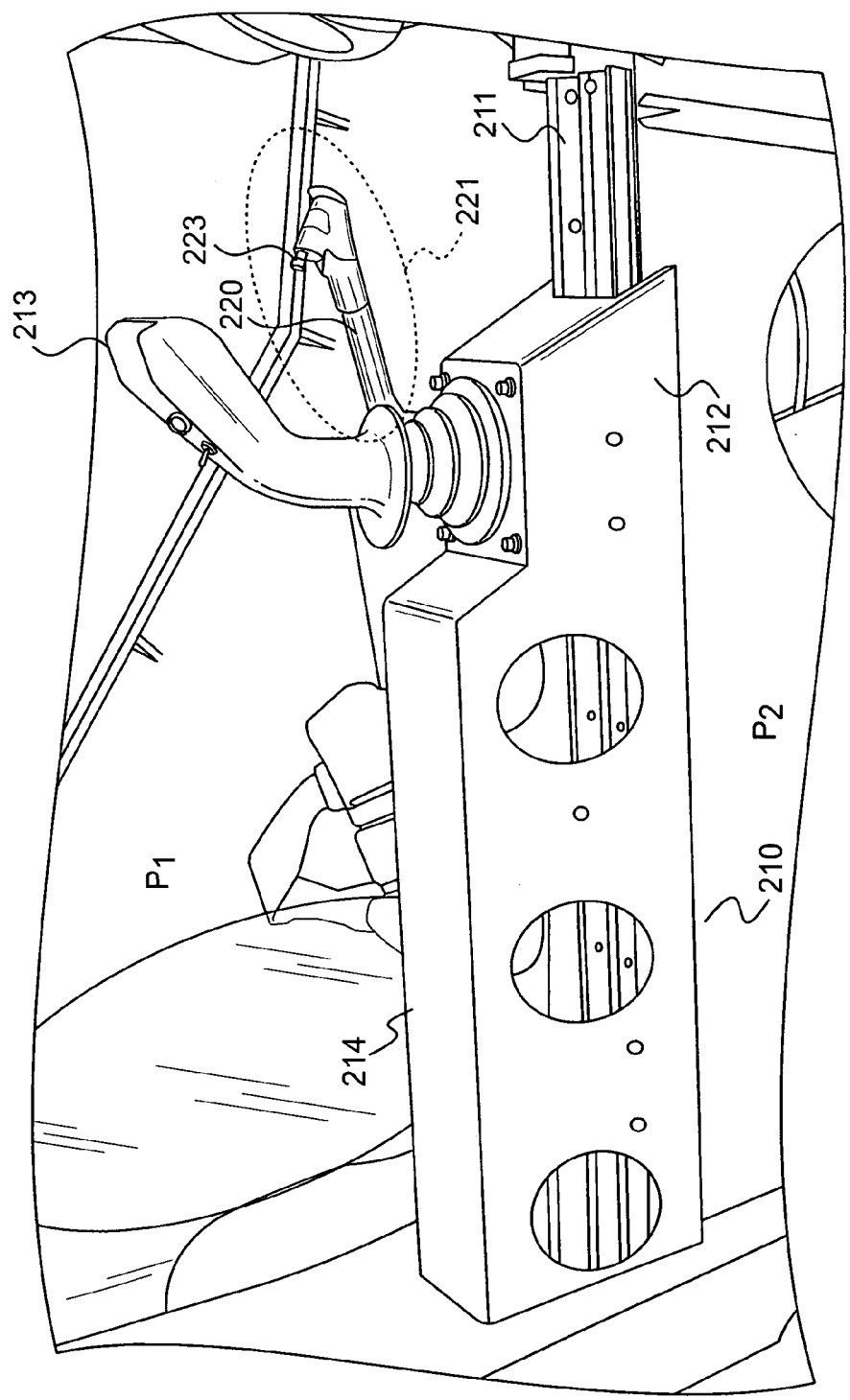
FIG. 5B is another schematic, partial perspective view of an exemplary gondola associated with an exemplary LA, showing an exemplary slider control and an exemplary collective pitch control.

FIG. 5B is another schematic, partial perspective view of exemplary gondola 35 associated with LA 10, viewed from the P2 position. FIG. 5B shows slider control 210 and collective pitch control 221 at the left side of the P1 seat.

Figure 5C:
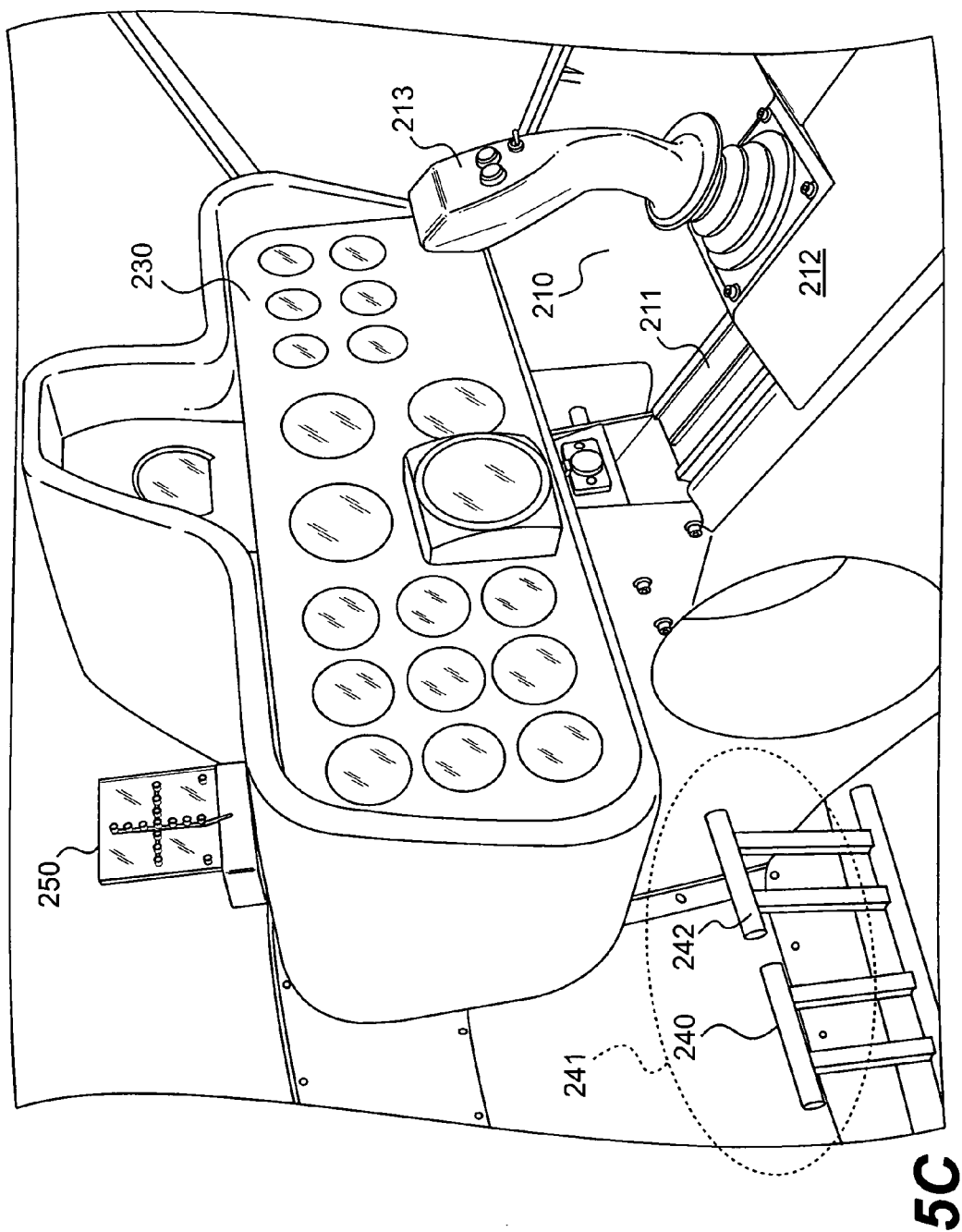
FIG. 5C is another schematic, partial perspective view of an exemplary gondola associated with an exemplary LA, showing an exemplary slider control, an exemplary yaw control, and an exemplary attitude indicator.

FIG. 5C is a schematic, partial perspective view of gondola 35 associated with LA 10, viewed from the P1 position. FIG. 5C also shows exemplary navigation instruments 230 associated with LA 10. Navigation instruments 230 may include analog instruments (e.g., altimeter, airspeed indicator, radios, etc.), digital instruments, and/or may include one or more multi-function displays (MFD). MFDs may include any avionics display providing displays of multiple functions, such as a primary-function display (PFD). As is well-known to those skilled in the art, an MFD may include a CRT display, a plasma display, an LCD display, a touch sensitive display, and/or any other type of electronic display device. Computer 600 may be linked to navigation instruments 230 and/or other systems associated with LA 10.

LA 10 may further include a yaw control 241 (see FIG. 5C) configured to control motion about yaw axis 7 of LA 10. Yaw control 241 may be configured to provide a signal computer 600 which may, in turn, cause propulsion assemblies and control surfaces associated with LA 10 to operate substantially in tandem to substantially achieve a desired yaw angle about yaw axis 7. Yaw control 241 may include, for example, pivoting pedal actuators 240 and 242 in gondola 35 as shown in FIG. 5C, configured to receive an input from an operator indicative of a desired yaw angle associated with LA 10. In some embodiments, pivoting pedal actuators 240 and 242 may be rudder pedals. One of ordinary skill in the art will recognize that the yaw control may include other suitable input devices, such as, for example, a yoke.

Yaw control 241, may be actuated, for example, via pivoting pedal actuators 240 and 242 affixed to a rudder bar (not shown), and/or any other similar devices. Forces about yaw axis 7 may be generated through use of one or more control surfaces (e.g., vertical control surface 350 and horizontal control surface 360) and/or the propulsive power sources (e.g., fore propulsion assembly 532, starboard propulsion assembly 533, port propulsion assembly 534, starboard thruster 541, and port thruster 542). For example, during a combined control between power sources and control surfaces, pivoting pedal actuators 240 and 242 may be communicatively connected to computer 600 associated with LA 10. Computer 600 may further be communicatively connected to one or more vertical control surfaces associated with LA 10 and/or the propulsive power sources configured to provide a thrust force for LA 10. Such connection may enable, for example, vertical control surface 350 to act substantially in tandem with starboard and port thrusters 541 and 542 to cause LA 10 to assume a desired yaw angle about yaw axis 7. Further, such connections may enable horizontal control surfaces 360 to operate substantially in tandem with starboard propulsion assembly 533 and port propulsion assembly 534 to cause LA 10 to assume a desired pitch and/or roll angle about pitch axis 6 and/or roll axis 5, respectively.

In some embodiments, pivoting pedal actuators 240 and/or a rudder bar (not shown) may function as yaw control 241 by receiving an input from an operator indicative of a desired yaw angle (e.g., via pedal deflection). Computer 600 may be configured to receive an output signal from pivoting pedal actuators 240 and 242 as a result of the operator input, and cause the vertical control surfaces and/or the propulsive power sources to operate either independently or in tandem, such that LA 10 substantially assumes the desired yaw angle.

Figure 6:
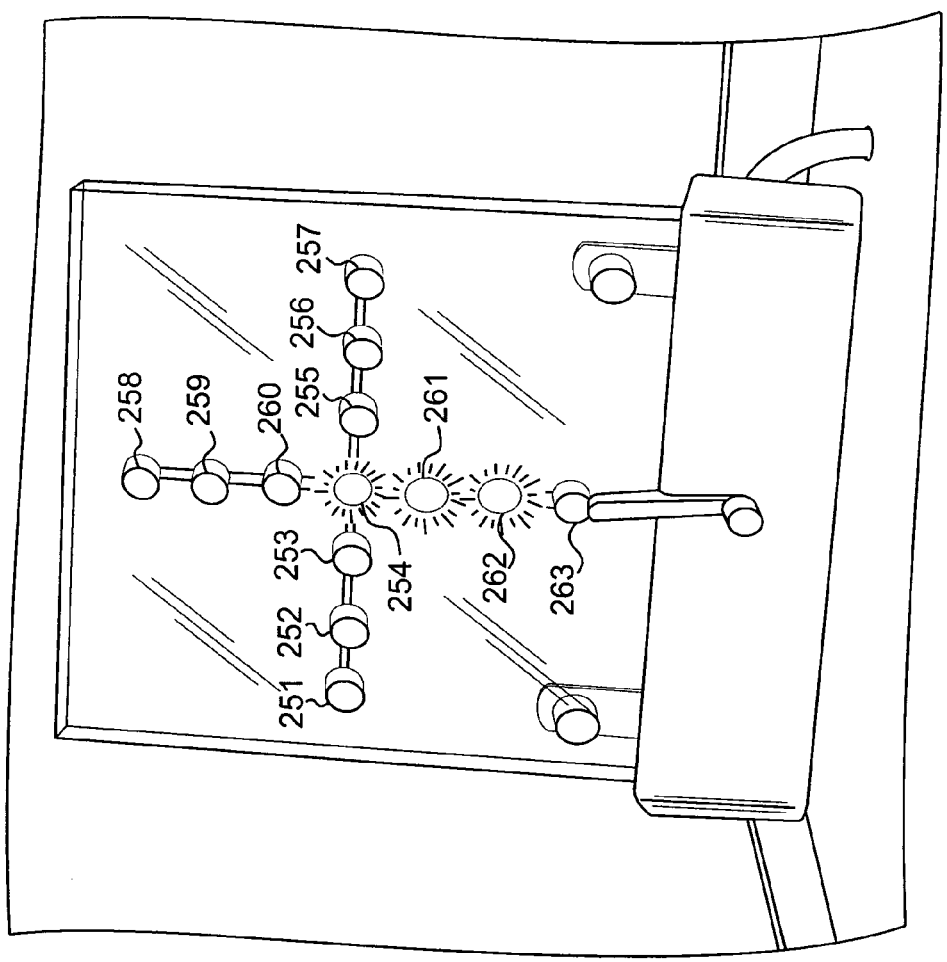
FIG. 6 is a schematic, front-side view of an exemplary embodiment of an attitude indicator.

LA 10 may further include a flight information display system for displaying various information associated with LA 10. According to some embodiments, the flight information display system may include a series of position sensors, which may be installed at various locations (e.g., in hull 22 of LA 10). These sensors may be configured to sense various parameters, such as for example, a position, velocity, and acceleration, among others associated with LA 10. These sensors may further generate an output corresponding to the sensed parameters. The flight information display system may be communicatively connected to computer 600 as shown in FIG. 7, which may include a processor. The processor may be configured to receive the sensor output and determine an attitude associated with LA 10 based on the sensor output. The processor may be communicatively connected with an attitude indicator 250, such that attitude indicator 250 may display attitude information associated with LA 10. For example, as shown in FIG. 6, which is a schematic, front-side view of an exemplary attitude indicator 250, exemplary attitude indicator 250 may be configured as a heads-up display (HUD) device located in a position of gondola 35 such that an operator may easily monitor various information associated with LA 10 without diverting attention from space in front of LA 10. For example, attitude indicator 250 may be located on the top of navigation instruments 230 (FIG. 5C). In some embodiments, attitude indicator 250 may be substantially transparent and include a plurality of indicators (e.g., LEDs, lamps, etc.) configured to display various information related to flight of LA 10, such as, an attitude of LA 10 and/or a velocity of LA 10, among other things.

For example, as shown in FIG. 6, a first plurality of indicators 251-257 may be arranged as a substantially straight line along a horizontal axis, with a second plurality of indicators 258-260 and 261-263, arranged as a substantially straight line along a vertical axis, and intersecting at indicator 254, thereby forming a cross. Attitude indicator 250 may be communicatively connected to computer 600, with each indicator configured to indicate attitude associated with LA 10. At least one indicator of the first plurality of indicators and/or the second plurality of indicators may respond (e.g., light up) according to the determination. The indicators may be arranged in any suitable configuration, which may provide an operator with an indication of the attitude of LA 10 and/or other information during maneuvers.

In some embodiments, indicator 254 at the center may be white, the next indicator in any direction (i.e., indicators 253, 255 in the horizontal direction, and indicators 260, 261 in the vertical direction) may be green, the next indicator (i.e., indicators 252, 256 in the horizontal direction, and indicators 259, 262 in the vertical direction) may be amber, and those at the extremes (i.e., indicators 251, 257 in the horizontal direction, and indicators 258, 263 in the vertical direction) may be red. The colors are exemplary only. In such embodiments, while LA 10 is in a neutral flight attitude (i.e., straight and level), only the central white indicator 254 may be illuminated. As the pitch angle of LA 10 declines, for example, indicator 261 below the central indicator 254 may light up in a green color. If the pitch continues to decline, indicator 262 may light up in an amber color. If the pitch angle continues declining, the final indicator 263 may light up in a red color. A similar arrangement of indicators may be set up for the pitch-up movement, the pitch-down movement, and port- and starboard-roll of LA 10. Alternatively, the indicators may actuate in an inverse direction from that previously described. For example, as a pitch angle of LA 10 decreases, indicator 260 may respond. As the pitch angle further decreases, indicators 259 and 258 may respond, indicating that the pitch of the aircraft has decreased to a predetermined amount. One of ordinary skill in the art will recognize that variations of the described schemes are possible without departing from the spirit of the present disclosure.

Attitude indicator 250 may provide the operator with a general guide during the flight. For example, it may allow the operator to keep his eyes on the area surrounding LA 10 while, at the same time, being constantly updated with data concerning LA 10's attitude (e.g., pitch and roll angles).

According to some embodiments, propulsion assemblies 31 and control surfaces, among other things, may be controlled by computer 600. FIG. 7 is a block diagram of an exemplary embodiment of a computer 600 consistent with the present disclosure. For example, as shown in FIG. 7, computer 600 may include a processor 605, a disk 610, an input device 615, an MFD 620, an optional external device 625, and/or interface 630. Computer 600 may include more or fewer components as desired. In this exemplary embodiment, processor 605 includes a CPU 635, which is connected to a random access memory (RAM) unit 640, a display memory unit 645, a video interface controller (VIC) unit 650, and an input/output (I/O) unit 655. The processor 605 may also include other components.

In this exemplary embodiment, disk 610, input device 615, MFD 620, optional external device 625, and interface 630 may be connected to processor 605 via I/O unit 655. Further, disk 610 may contain data structures and/or other information that may be processed by processor 605 and displayed on MFD 620. Input device 615 may include mechanisms by which a user and/or system associated with LA 10 may access computer 600. Optional external device 625 may allow computer 600 to manipulate other devices via control signals. For example, a fly-by-wire or fly-by-light system may be included, allowing control signals to be sent to optional external devices, including, for example, servo motors associated with propulsion unit mounts 430 and/or control surfaces associated with horizontal and vertical stabilizing member 310 and 315. "Control signals," as used herein, may mean any analog, digital, and/or signals in other formats configured to cause operation of an element related to LA 10 (e.g., a signal configured to cause operation of one or more control surfaces associated with LA 10). "Fly-by-wire," as used herein, means a control system wherein control signals may be passed in electronic form over an electrically conductive material (e.g., copper wire). According to some embodiments, such a system may include a computer 600 between the operator controls and the final control actuator or surface, which may modify the inputs of the operator in accordance with predefined software programs. "Fly-by-light," as used herein, means a control system where control signals are transmitted similarly to fly-by-wire (i.e., including a computer 600), but wherein the control signals may be transmitted via light over a light conducting material (e.g., fiber optics).

According to some embodiments, interface 630 may allow computer 600 to send and/or receive information other than by input device 615. For example, computer 600 may receive signals indicative of control information from flight controls 720, a remote control, position sensors associated with LA 10, and/or any other suitable device. Computer 600 may then process such commands and transmit appropriate control signals to various systems associated with LA 10 (e.g., propulsion system 30, vertical and horizontal control surfaces 350 and 360, etc.). Computer 600 may also receive weather and/or ambient condition information from sensors associated with LA 10 (e.g., altimeters, navigation radios, pitot tubes, etc.) and utilize such information for generating control signals associated with operating LA 10 (e.g., signals related to trim, yaw, and/or other adjustments).

Consistent with the present disclosure, computer 600 may receive an input related to a desired yaw angle from yaw control 241, joystick 213, or any other suitable input devices associated with LA 10. Computer 600 may further receive a signal indicative of a desired modification to one or more of the parameters associated with LA 10 (e.g., velocity, thrust vector, etc.), for example, from slider control 210. For example, the signal may correspond to the offset of slider control 210 relative to a neutral position. In addition, computer 600 may also receive a pitch control signal from collective pitch control 221, indicative of the desired lift force.

According to some embodiments, computer 600 may include software, data structures, and/or systems enabling other functionality. For example, computer 600 may include software allowing for automatic pilot control of LA 10. Automatic pilot control may include any functions configured to automatically maintain a preset course and/or perform other navigation functions independent of an operator of LA 10 (e.g., stabilizing LA 10, preventing undesirable maneuvers, automatic landing, etc.). For example, computer 600 may receive information from an operator of LA 10 including a flight plan and/or destination information. Computer 600 may use such information in conjunction with autopilot software for determining appropriate commands to propulsion units and control surfaces for purposes of navigating LA 10 according to the information provided.

Consistent with the present disclosure, computer 600 may also include software allowing for flight control, based on signals received from input devices associated with LA 10. For example, computer 600 may include functions and data enabling receipt of a signal from yaw control 241, determination of related values, and generation of a control signal configured to modify propulsion assemblies 31 and/or control surfaces, based on the desired yaw angle. An exemplary method for controlling yaw will be described in more detail in connection with FIG. 7. As another example, computer 600 may also include software to perform parameter controls associated with LA 10, based on the received offset signal associated with slider control 210. An exemplary method for parameter control will be described in more detail in connection with FIG. 9. In yet another example, computer 600 may include functions and data structures configured to determine a desired lift force associated with LA 10 based on a received pitch control signal from collective pitch control 221. An exemplary method for propeller pitch controlling will be described in more detail in connection with FIG. 10. In yet another example, computer and/or other components may be operably coupled to processor 605 via I/O unit 655. According to some embodiments, no computer may be used, or more than one computer may be used for redundancy. These configurations are merely exemplary, and other implementations will fall within the scope of the present disclosure.

Figure 8:
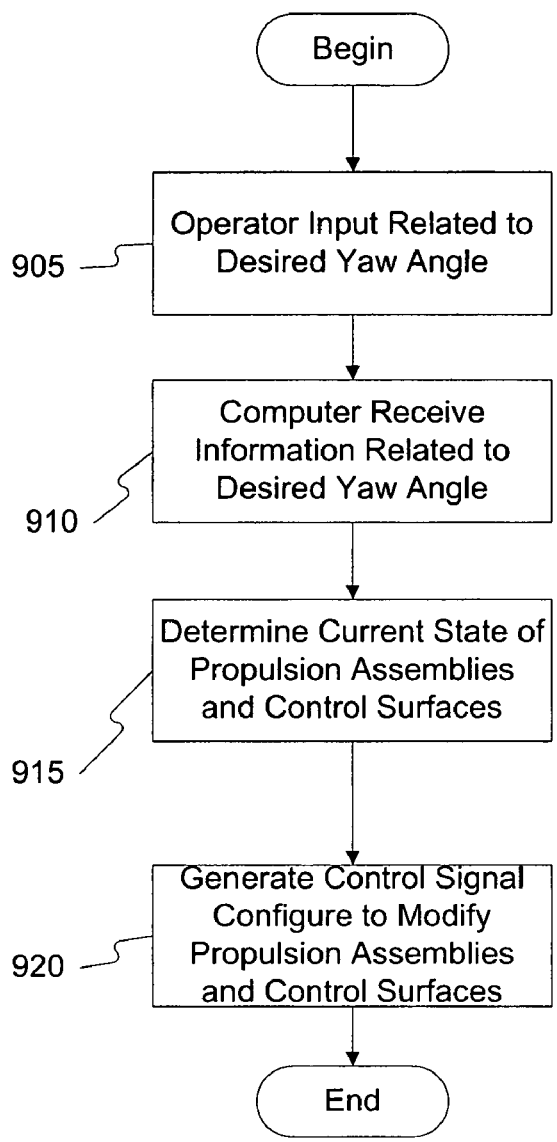
FIG. 8 is a block diagram depicting an exemplary embodiment of a method for controlling yaw associated with an airship.

FIG. 8 is a block diagram 900 depicting an exemplary method for controlling yaw associated with LA 10. As described above, an operator may provide an input related to a desired yaw angle to be obtained by LA 10 to computer 600 (step 905). Such an input may be provided via yaw control 241 (e.g., yaw pedal actuators 240), joystick 213, or any other suitable method. Upon receiving information related to the desired yaw angle (step 910), computer 600 may determine a current state of, among others, LA 10, propulsion assemblies 31, and controls surfaces (e.g., vertical and horizontal control surfaces 350 and 360, respectively) (step 915). The current state may include a velocity of LA 10, propeller pitch of one or more propulsion assemblies 31 (e.g., starboard thruster 541 and port thruster 542), and/or an angle associated with vertical control surface 350. For example, computer 600 may determine that starboard thruster 541 and port thruster 542 are operating at substantially the same power output and at substantially the same propeller pitch. Further computer 600 may determine that an angle associated with vertical control surface is substantially zero. Based on the yaw angle desired, computer 600 may generate a control signal configured to modify propulsion assemblies 31 (e.g., starboard thruster 541 and port thruster 542) and/or control surfaces (e.g., vertical control surface 350) (step 920). For example, computer 600 may utilize a lookup table or other reference to determine values corresponding to the desired yaw angle, and subsequently generate a signal configured to cause a modification to a propeller pitch and a power output associated with starboard thruster 541, such that a thrust vector associated with starboard thruster 541 is substantially greater than that associated with port thruster 542. Further, computer 600 may generate a control signal configured to cause vertical control surface 350 to pivot to the left. Computer 600 may transmit such signals via an electrical transmission system, electromechanical transmission system, or other suitable system (e.g., fly-by-light). Further, one of ordinary skill in the art will recognize that computer 600 may generate a signal configured to operate any of the systems associated with LA 10 such that the desired yaw angle is achieved.

Figure 9:
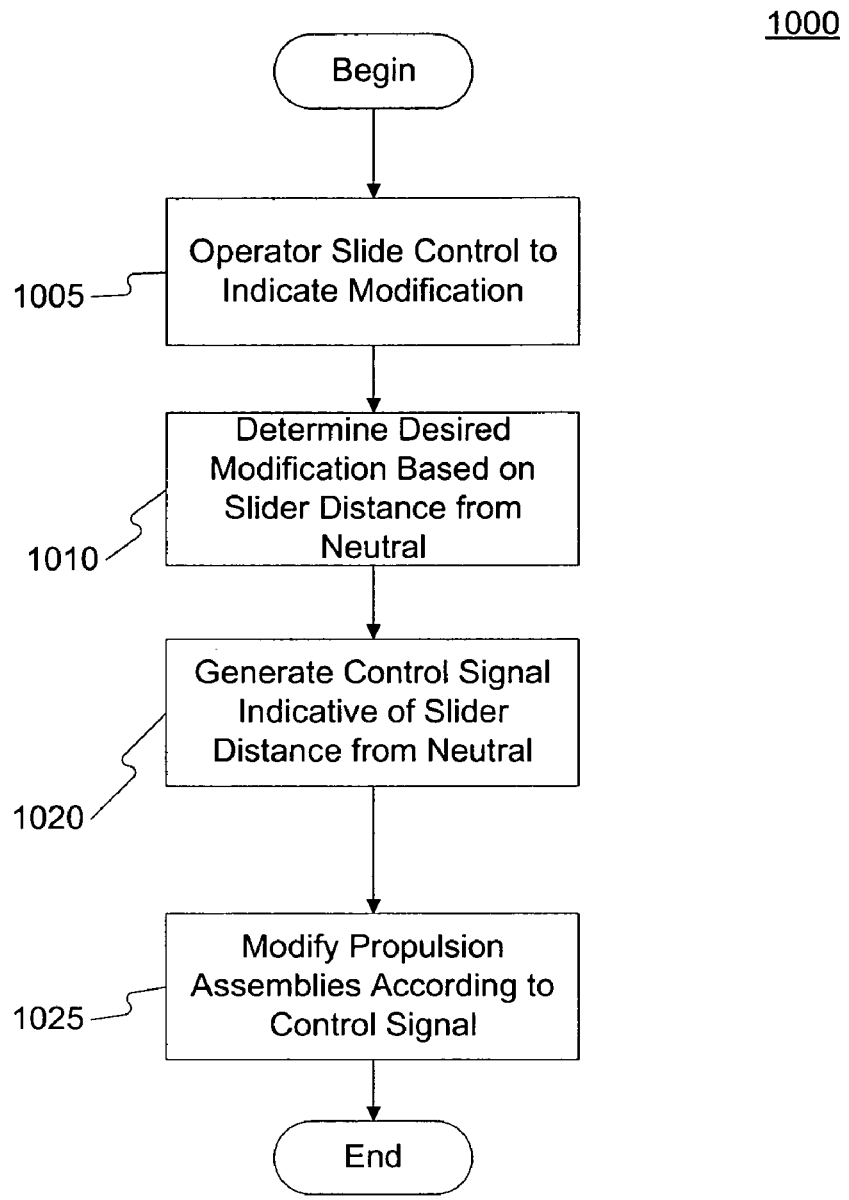
FIG. 9 is a block diagram depicting an exemplary embodiment of a method for controlling at least one parameter associated with an airship.

FIG. 9 is a block diagram 1000 depicting an exemplary method for controlling at least one parameter associated with LA 10. An operator of LA 10 may utilize slider control 210 for providing an indication of a desired modification to one or more parameters associated with LA 10 (step 1005). For example, an operator of LA 10 may desire greater forward airspeed and may therefore slide slider control 210 forward of a predetermined neutral position, indicating a desire for additional forward airspeed. Computer 600 may then determine the level of desired modification based on a signal from slider control 210 (step 1010). For example, where an operator slides slider control 210 to a position a short distance from a predetermined neutral position, computer 600 may determine that the desired modification is proportionally small to the offset of slider control 210 from the predetermined neutral position. Computer 600 may utilize a lookup table or other reference to determine values related to the offset and subsequently generate a control signal configured to cause a power output associated with starboard thruster 541 and port thruster 542 to increase to a level determined to cause the desired modification (step 1020). Upon receiving such a control signal, starboard and port thrusters 541 and 542, respectively, may respond substantially simultaneously to provide the desired power increase (step 1025). As noted above, in addition to modifying the power output of propulsion assemblies 31, the control signal may also modify propeller pitch of power conversion units 415 associated with propulsion assemblies 31. One of ordinary skill in the art will recognize that while the previous description concerned primarily propeller based propulsion assemblies, other propulsion assemblies are contemplated. For example, based on input to slider control 210, computer 600 may modify operational parameters of a jet gas-turbine engine or other suitable propulsion assembly.

Figure 10:
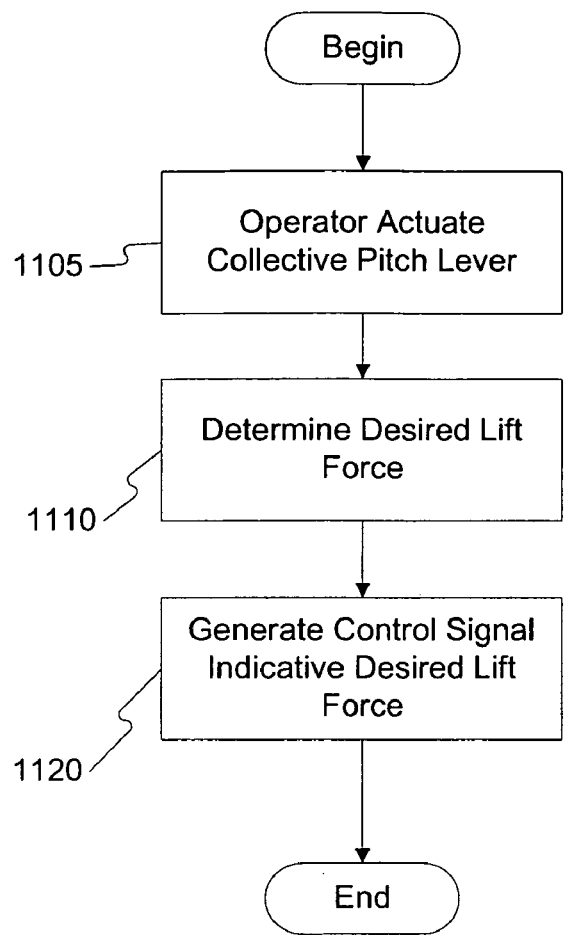
FIG. 10 is a block diagram depicting an exemplary embodiment of a method for controlling propeller pitch related to three or more propulsion assemblies associated with an airship.

FIG. 10 is a block diagram 1100 depicting an exemplary method for controlling propeller pitch related to three or more propulsion assemblies associated with LA 10. An operator of LA 10 may actuate collective pitch control 221 (e.g., using collective pitch lever 220) to indicate a desired lift force associated with LA 10 (step 1105). For example, an operator of LA 10 desiring a greater lift force associated with LA 10 may pull collective pitch lever 220 to cause collective pitch lever 220 to pivot in an upward direction. The operator may continue to actuate collective pitch lever 220 until the operator has determined that a desired lift has been achieved. In some embodiments, the operator may subsequently lock collective pitch lever 220 once the desired lift has been achieved via lock button 223 or other suitable method (e.g., twist lock). As an operator actuates collective pitch control 221, computer 600 may determine a desired lift force based on the deflection and/or other attribute associated with collective pitch lever 220 (step 1110). For example, computer 600 may receive a signal indicating a deflection associated with collective pitch lever 220, and may subsequently use a lookup table or other data structure for purposes of determining values for a control signal. Upon determining the values, computer 600 may generate a control signal configured to cause propeller pitch and/or power source output for each of fore, starboard, and port propulsion assemblies 532, 533, and 534 to substantially synchronize for purposes of providing the desired lift force (i.e., thrust vector) (step 1120). Note, such a thrust vector may be oriented to cause positive or negative lift.

Figure 11:
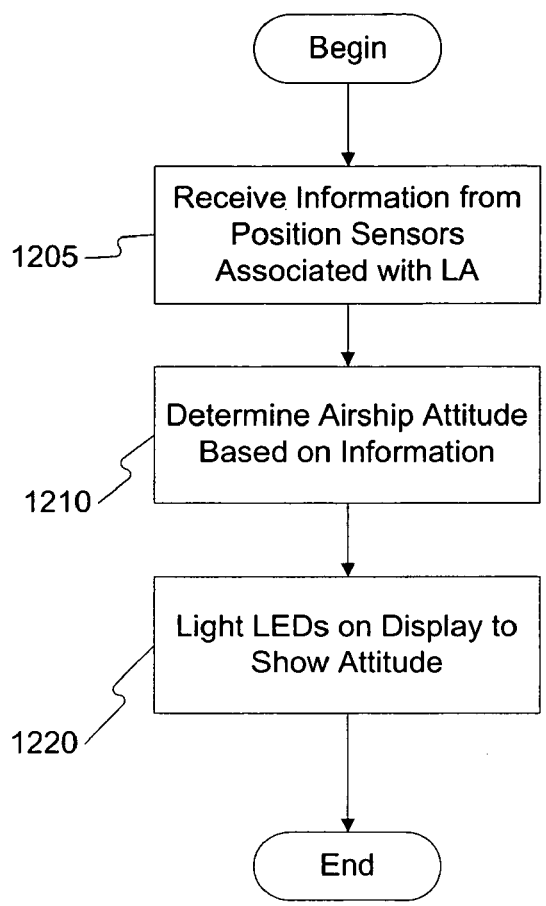
FIG. 11 is a block diagram depicting an exemplary embodiment of a method for displaying attitude information associated with an airship.

FIG. 11 is a block diagram 1200 depicting an exemplary method for displaying attitude information associated with LA 10. As noted above, LA 10 may include one or more position sensors configured to sense attitude of LA 10 (i.e., inclination of roll, pitch, and yaw axes 5, 6, 7, respectively, of LA 10 relative to the ground), among other things. Computer 600 may receive such information from position sensors or other suitable devices (step 1205). Based on such information, computer 600 may determine an attitude associated with LA 10 (step 1210). Computer 600 may then cause various indicators on attitude indicator 250 to respond (step 1220). For example, where the attitude associated with LA 10 is determined to be substantially nose down, computer 600 may cause indicators 261, 262, and 263 to respond (e.g., light up). Further, if the attitude is both nose down and rolling to the left, computer 600 may cause indicators 253, 252, and 251 to respond (e.g., light up). One of ordinary skill in the art will recognize that numerous such configurations are possible based on the determined attitude and that the description herein is intended as exemplary only.

Other embodiments of the invention will be apparent to those skilled in the art from consideration of the specification and practice of the invention disclosed herein. For example, LA 10 may include a platform or other cargo carrying structure configured to suspend communications equipment (e.g., satellite relay/receiver, cell tower, etc.) over a particular location. Because LA 10 may utilize, for example, associated control surfaces, propulsion assemblies 31, and its oblate spheroid shape to remain suspended and substantially stationary over a given location, LA 10 may operate as a communications outpost in desired areas. Further, based on numerous characteristics of LA 10, other functions, including, but not limited to, construction lifting, transportation (e.g., passenger carriage and/or tourism), satellite communications, display (e.g., advertising), recreation, military or other reconnaissance/surveillance (e.g., for border patrol), disaster relief support, scientific studies, etc. may be performed utilizing LA 10. Such functions may be performed by remotely controlling and/or utilizing manned flights of LA 10.

It is intended that the specification and examples be considered as exemplary only, with a true scope and spirit of the invention being indicated by the following claims.

What is claimed is:

1. A system for displaying attitude information associated with an airship, the system comprising:
    a first plurality of indicators arranged along a horizontal axis configured to display a representation of a roll angle associated with the airship;
    a second plurality of indicators arranged along a vertical axis, the second plurality of indicators intersecting the first plurality of indicators at an intersection; and
    a processor configured to:
       determine an attitude associated with the airship; and
       cause at least one indicator of the first plurality of indicators or the second plurality of indicators to respond based on the attitude, wherein the number of the first plurality of indicators which respond indicates the roll angle associated with the airship.

2. The system of claim 1, wherein the first and second plurality of indicators comprise light emitting diodes.

3. The system of claim 2, wherein the response comprises lighting at least one of the light emitting diodes.

4. The system of claim 1, further comprising a position sensor configured to sense a position associated with the airship and provide a signal indicative of the airship position to the processor.

5. The system of claim 4, wherein the processor is configured to determine the attitude based on the signal.

6. The system of claim 1, wherein the attitude comprises a pitch angle and a roll angle.

7. The system of claim 1, wherein the second plurality of indicators is configured to display a representation of a pitch angle associated with the airship.

8. The system of claim 1, further comprising a centered indicator at the intersection having a color distinct from any other indicators of the first plurality of indicators and the second plurality of indicators.

9. The system of claim 8, wherein the centered indicator has a white color, and the other indicators associated with the first plurality of indicators and the second plurality of indicators have one of a green color, amber color and/or red color.

10. The system of claim 1, wherein the first plurality of indicators and the second plurality of indicators are arranged on a substantially transparent material forming a display.

11. The system of claim 10, wherein the display is positioned within a gondola associated with the airship so as to be in a line-of-site of an operator.

12. The system of claim 10, wherein the display is positioned on top of an instrument cluster in the gondola.

13. The system of claim 1, wherein the system is configured to form a heads-up display.

14. A method for displaying attitude information associated with an airship, the method comprising:
    receiving a signal indicative of an attitude associated with the airship;
    determining an attitude associated with the airship based on the signal; and
    causing at least one indicator of a first plurality of indicators and a second plurality of indicators to respond according to the attitude, the first plurality of indicators being arranged substantially along a horizontal axis, and the second plurality of indicators being arranged substantially along a vertical axis and intersecting the first plurality of indicators, wherein the number of the first plurality of indicators which respond indicates a roll angle associated with the airship.

15. The method of claim 14, wherein the first and second plurality of indicators comprise light emitting diodes.

16. The method of claim 15, wherein the causing of at least one indicator of a first plurality of indicators and a second plurality of indicators to respond according to the attitude comprises lighting at least one of the light emitting diodes.

17. The method of claim 14, wherein the attitude comprises a pitch angle and a roll angle.

18. The method of claim 17, wherein the first and second plurality of indicators comprise light emitting diodes and the causing of at least one indicator of a first plurality of indicators and a second plurality of indicators to respond according to the attitude comprises lighting at least one of the light emitting diodes of the first plurality of indicators to display a representation of the roll angle.

19. The method of claim 17, wherein the first and second plurality of indicators comprise light emitting diodes and the causing of at least one indicator of a first plurality of indicators and a second plurality of indicators to respond according to the attitude comprises lighting at least one of the light emitting diodes of the second plurality of indicators to display a representation of the pitch angle.

20. The method of claim 17, wherein a centered indicator at the intersection of the first plurality of indicators and the second plurality of indicators has a white color, and other indicators associated with the first plurality of indicators and the second plurality of indicators have one of a green color, amber color, and/or red color progressing in a direction away from the centered indicator.

21. The method of claim 17, further comprising causing only a centered indicator at the intersection of the first plurality of indicators and the second plurality of indicators, to respond when a pitch angle and a roll angle associated with the airship are substantially equal to zero.

22. The method of claim 14, wherein the first plurality of indicators and the second plurality of indicators are arranged on a substantially transparent material forming a display.

23. A system for displaying attitude information associated with an airship, the system comprising:
    a sensor configured to sense an attitude associated with the airship and generate a corresponding sensor output;
    a substantially transparent display;
    a first plurality of indicators arranged along a horizontal axis of the display configured to display a representation of a roll angle associated with the airship;
    a second plurality of indicators arranged along a vertical axis of the display, the second plurality of indicators intersecting the first plurality of indicators; and
    a processor configured to:
       determine an attitude associated with the airship based on the sensor output; and
       cause at least one indicator of the first plurality of indicators to light according to the attitude, wherein the number of the first plurality of indicators which respond indicates the roll angle associated with the airship.

* * * * *